US012775233B2

(12) United States Patent
Yokoyama

(10) Patent No.: US 12,775,233 B2
(45) Date of Patent: Oct. 27, 2026

(54) SHEET PROCESSING APPARATUS AND IMAGE FORMING SYSTEM

(71) Applicant: CANON KABUSHIKI KAISHA, Tokyo (JP)

(72) Inventor: Seiji Yokoyama, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/358,228

(22) Filed: Oct. 14, 2025

(65) Prior Publication Data

US 2026/0140472 A1 May 21, 2026

(30) Foreign Application Priority Data

Oct. 22, 2024 (JP) ................................ 2024-185911

(51) Int. Cl.
*G03G 15/00* (2006.01)

(52) U.S. Cl.
CPC ..... *G03G 15/6544* (2013.01); *G03G 15/6573* (2013.01); *G03G 2215/00421* (2013.01); *G03G 2215/00556* (2013.01); *G03G 2215/00835* (2013.01); *G03G 2215/00936* (2013.01)

(58) Field of Classification Search
CPC ........... G03G 15/6538; G03G 15/6541; G03G 15/6544; G03G 15/6573; G03G 2215/00421; G03G 2215/00556; G03G 2215/00835; G03G 2215/00936; B42C 1/12; B42C 19/02; B42C 19/08; B65H 37/04; B65H 2801/48
See application file for complete search history.

(56) References Cited

U.S. PATENT DOCUMENTS

| | | | | |
|---|---|---|---|---|
| 2012/0070250 | A1* | 3/2012 | Ando | B26F 1/12 412/6 |
| 2015/0170349 | A1* | 6/2015 | Mochizuki | G06T 7/001 270/52.02 |
| 2016/0065753 | A1* | 3/2016 | Tachibana | G06F 3/1234 358/1.14 |
| 2024/0383716 | A1* | 11/2024 | Mita | B65H 29/125 |
| 2025/0033399 | A1* | 1/2025 | Sugai | B42C 1/125 |
| 2025/0135798 | A1* | 5/2025 | Iwasawa | G03G 15/2064 |

FOREIGN PATENT DOCUMENTS

| | | | |
|---|---|---|---|
| JP | 2010001088 | A | 1/2010 |
| JP | 2012144326 | A | 8/2012 |
| JP | 2014237291 | A | 12/2014 |
| JP | 2021095291 | A | 6/2021 |

* cited by examiner

*Primary Examiner* — Benjamin R Schmitt
(74) *Attorney, Agent, or Firm* — Canon U.S.A., Inc. IP Division

(57) ABSTRACT

A booklet generation apparatus capable of generating a booklet without contaminating a layered booklet. In a case where a determination unit determines that there is an image in a region of a front cover of the (k+1)th booklet or a rear cover of the k-th booklet that is to be heated and pressurized by the bonding unit, a conveyance unit is caused to convey a sheet bundle without including a sheet to be included in the (k+1)th booklet from the forming unit to the stacking unit.

20 Claims, 21 Drawing Sheets

V2
S1
27
21
22
26
23
44
24a
24b
24

CONVEYANCE STOP
S1
S2
27
21
22
26
23
44
24a
24b

V1
V2
S1
S2
27
21
22
26
23
44
24a
24b
F1
F2

CONVEYANCE STOP
V1
E1
S1
S2
27
21
22
26
23
44
24a
24b

SHEET PROCESSING APPARATUS AND IMAGE FORMING SYSTEM

BACKGROUND

Field of the Technology

The aspect of the embodiments relates to a sheet processing apparatus and an image forming system.

Description of the Related Art

A booklet generation method is known in which a booklet generation apparatus re-melts adhesive toner to bond sheets of a sheet bundle consisting of a plurality of sheets on which an image forming process has been performed by an image forming apparatus, such as a printer or a copy machine, as described in Japanese Patent Laid-Open No. 2021-095291. A heating and pressurizing unit configured to heat and pressurize a sheet using a pressurizing portion in contact with a heating member is known, as described in Japanese Patent Laid-Open No. 2021-095291.

The booklet generation efficiency of the booklet generation apparatus described in Japanese Patent Laid-Open No. 2021-095291 can be improved if a plurality of booklets is continuously generated at a stacking portion and then discharged together, instead of discharging a booklet from the heating and pressurizing unit each time a single booklet is complete. In this case, a subsequent booklet is heated and pressured on a lower booklet. Thus, in a case where there is an image at a position on a front cover of the booklet that is to be heated and pressurized, the image may transfer to a front cover of another layered booklet, which may contaminate the booklet.

SUMMARY

According to an aspect of the embodiments, an apparatus includes a forming unit configured to receive a sheet one by one and form a sheet bundle consisting of a maximum of N sheets, a conveyance unit configured to convey the sheet bundle upon completion of sheet bundle formation, a stacking unit configured to stack the conveyed sheet bundle, a bonding unit configured to generate a booklet consisting of M sheets by heating and pressurizing an adhesion portion each time the sheet bundle is stacked on the stacking unit, a discharge unit configured to discharge, upon completion of generation of L booklets at the stacking unit, the L booklets from the stacking unit, a control unit configured to control the forming unit, the conveyance unit, the stacking unit, the bonding unit, and the discharge unit, and a determination unit configured to determine whether there is an image in a region of a front cover of a booklet or a rear cover of a booklet that is to be heated and pressurized by the bonding unit, wherein the forming unit generates a sheet bundle consisting of N sheets including an M-th sheet to be included in a k-th booklet and a first sheet to be included in a (k+1)th booklet, wherein the bonding unit bonds a preceding sheet and a subsequent sheet stacked on the stacking unit, excluding the M-th sheet to be included in the k-th booklet and the first sheet to be included in the (k+1)th booklet, and wherein the control unit counts a number i of sheets layered at the forming unit, wherein in a case where the determination unit determines that there is no image in a region of a front cover of the (k+1)th booklet or a rear cover of the k-th booklet that is to be heated and pressurized by the bonding unit, if i reaches N, the control unit causes the conveyance unit to convey the sheet bundle from the forming unit to the stacking unit, and wherein in a case where the determination unit determines that there is an image in the region of the front cover of the (k+1)th booklet or the rear cover of the k-th booklet that is to be heated and pressurized by the bonding unit, even if i is less than N, the control unit causes the conveyance unit to convey the sheet bundle without including a sheet to be included in the (k+1)th booklet from the forming unit to the stacking unit.

Features of the disclosure will become apparent from the following description of embodiments with reference to the attached drawings. The following description of embodiments is described by way of example.

DESCRIPTION OF THE EMBODIMENTS

Figure 1:
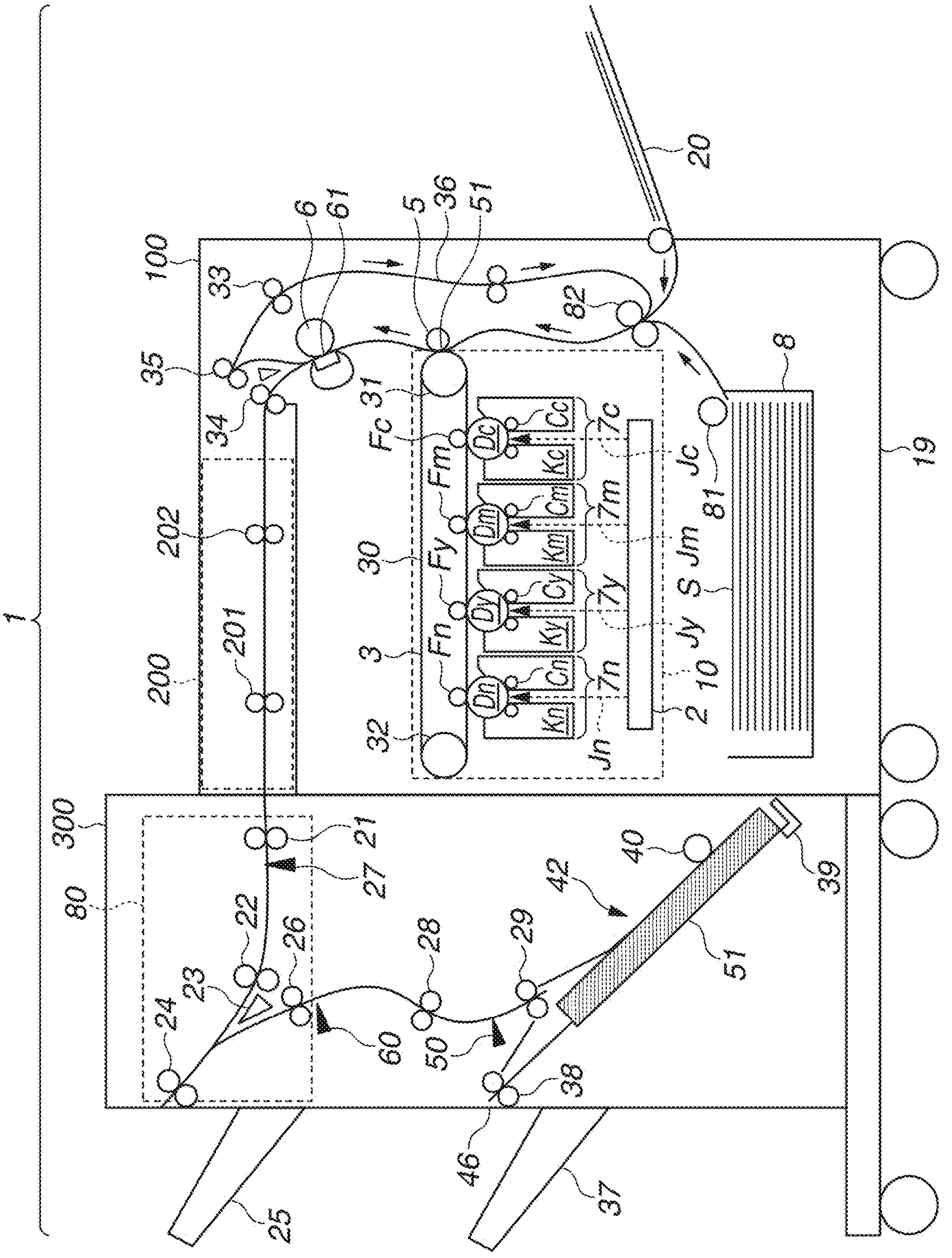
FIG. 1 is a diagram illustrating an image forming system.

Embodiments will be described in detail with reference to the attached drawings. It should be noted that the embodiments described below are not intended to limit the claimed disclosure. Although a plurality of features is described in the embodiments, not all the features are necessarily essential to the disclosure, and the plurality of features may be combined in any way. Furthermore, components that correspond to or are similar to each other are assigned the same reference numeral, and redundant descriptions are omitted.

First Embodiment (1) Image Forming System

As illustrated in FIG. 1, an image forming system 1 includes an image forming apparatus 100 and a post-processing apparatus 300. The post-processing apparatus 300 is a sheet processing apparatus connected to the image forming apparatus 100. The image forming apparatus 100 forms an image on a sheet S, which is a recording material. An intermediate conveyance unit 200 conveys the sheet S with the image formed thereon to the post-processing apparatus 300. The post-processing apparatus 300 performs post-processing on the sheet S when necessary and outputs the sheet S.

The image forming apparatus 100 includes a sheet cassette 8, an image forming unit 10, a fixing device 6, and a housing 19 accommodating them. The image forming unit 10 forms a toner image on a sheet S fed from the sheet cassette 8. The fixing device 6 performs a fixing process to fix the toner image to the sheet S.

The sheet cassette 8 is positioned in a lower part of the image forming apparatus 100. The sheet cassette 8 is removably inserted in the housing 19 and can store a large number of sheets S. A feed roller 81 feeds a sheet S from the sheet cassette 8 and passes the sheet S to a conveyance roller pair 82. A multi-tray 20 can also feed a sheet S individually.

The image forming unit 10 is a tandem type electrophotographic unit including four process cartridges 7*n*, 7*y*, 7*m*, and 7*c*, a scanner unit 2, and a transfer unit 3.

It should be noted that the letter "n" appended to a reference numeral denotes an adhesive. The letters "y", "m", and "c" denote yellow, magenta, and cyan, respectively. The process cartridges 7*n*, 7*y*, 7*m*, and 7*c* enable integral replacement of a plurality of parts involved in an image forming process. In other words, the plurality of parts is combined, thereby forming the process cartridges 7*n*, 7*y*, 7*m*, and 7*c*.

The process cartridges 7*n*, 7*y*, 7*m*, and 7*c* respectively include corresponding toner storage portions Kn, Ky, Km, and Kc, photosensitive drums Dn, Dy, Dm, and Dc, and charging rollers Cn, Cy, Cm, and Cc. The process cartridges 7*n*, 7*y*, 7*m*, and 7*c* have substantially the same structure, except for the type of toner.

The toner storage portions Ky, Km, and Kc respectively store yellow, magenta, and cyan toners for forming a visible image on a sheet S. The toner storage portion Kn stores an adhesive toner Tn. The adhesive toner Tn is a powdered adhesive used to bind a plurality of sheets S by the post-processing apparatus 300 using heat and pressure. The powdered adhesive may be a powdered adhesive that has thermoplastic properties or exhibits adhesion with pressure alone. It should be noted that an adhesive toner image is formed on the photosensitive drum Dn by developing with the adhesive toner Tn. The adhesive toner image is not intended to convey visual information. Thus, the adhesive toner image differs from a toner image (normal toner image) formed with printing toner for recording an image of graphics, text, and the like on a sheet S. However, in the following description, the adhesive toner Tn is applied in a predetermined application pattern to a sheet S. Accordingly, a layered image of the adhesive toner Tn developed by an electrophotographic process is also treated as a "toner image".

In the case of printing a black image such as text, the yellow, magenta, and cyan toners are overlaid to realize the black image (process black). However, the image forming unit 10 may include a fifth process cartridge that uses black toner. It should be noted that the type and number of printing toners can be changed according to the intended use of the image forming apparatus 100.

The charging rollers Cn, Cy, Cm, and Cc are charging devices and uniformly charge surfaces of the corresponding charging rollers Cn, Cy, Cm, and Cc. The scanner unit 2 is positioned below the process cartridges 7*n*, 7*y*, 7*m*, and 7*c* and above the sheet cassette 8. The scanner unit 2 irradiates the photosensitive drums Dn, Dy, Dm, and Dc with corresponding laser light beams Jn, Jy, Jm, and Jc, respectively, to form electrostatic latent images. The scanner unit 2 may also be referred to as an exposure device or optical scanning apparatus.

The toner storage portions Kn, Ky, Km, and Kc apply the toners to the electrostatic latent images on the photosensitive drums Dn, Dy, Dm, and Dc to form toner images. The toner storage portions Kn, Ky, Km, and Kc may also be referred to as development devices.

The transfer unit 3 includes a transfer belt 30 as an intermediate transfer member (secondary image bearing member). The transfer belt 30 is an endless belt wound around an inner roller 31 and a stretching roller 32. An outer peripheral surface (image forming surface) of the transfer belt 30 faces the photosensitive drums Dn, Dy, Dm, and Dc. On an inner peripheral surface of the transfer belt 30, primary transfer rollers Fn, Fy, Fm, and Fc are positioned to face the photosensitive drums Dn, Dy, Dm, and Dc.

The primary transfer rollers Fn, Fy, Fm, and Fc transfers the toner images from the corresponding photosensitive drums Dn, Dy, Dm, and Dc onto the transfer belt 30. The primary transfer rollers Fn, Fy, Fm, and Fc may also be referred to as primary transfer devices. As the transfer belt 30 is rotated counterclockwise, the toner images are conveyed to a secondary transfer portion.

A secondary transfer roller 5 is positioned to face the inner roller 31 and forms a transfer nip 52 between the secondary transfer roller 5 and the transfer belt 30. The transfer nip 52 transfers the toner images from the transfer belt 30 onto the sheet S. The transfer nip 52 may also be referred to as the secondary transfer portion.

The fixing device 6 is positioned above the secondary transfer roller 5 (downstream in a conveyance direction of the sheet S). The fixing device 6 applies heat and pressure to the sheet S passing through a fixing nip 61. Consequently, the toner images are fixed onto the sheet S. Specifically, printing toners Ty, Tm, and Tc and the adhesive toner Tn are melted and fixed onto the sheet S.

Figure 2A:
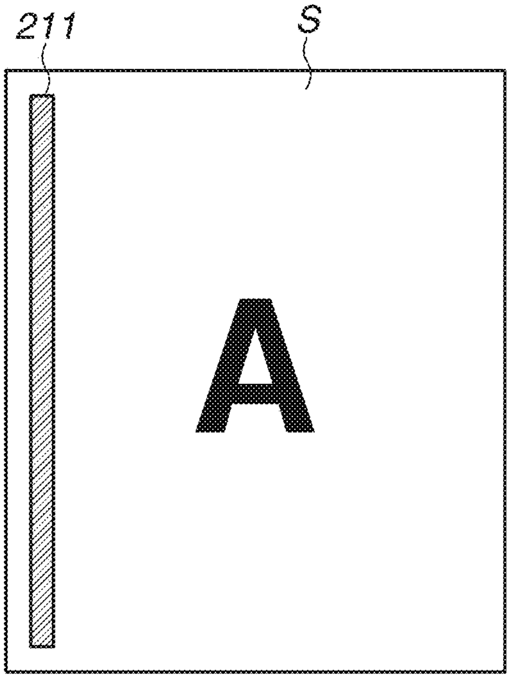
FIGS. 2A and 2B are diagrams illustrating print regions of an adhesive.

FIG. 2A illustrates a print region 211 of the adhesive toner Tn. The print region 211 extends parallel to the long edge of the sheet S. The print region 211 is positioned in an edge portion near the long edge. Thus, when the post-processing apparatus 300 layers a plurality of sheets S and applies heat and pressure to the print regions 211, which are adhesion portions of the plurality of sheets S, the plurality of sheets S is bonded, thereby forming a booklet. The booklet in this case is a long-edge bound booklet. The width (the length in the short edge direction) of each adhesive toner image (each print region 211) is, for example, 4.0 mm.

Figure 2B:
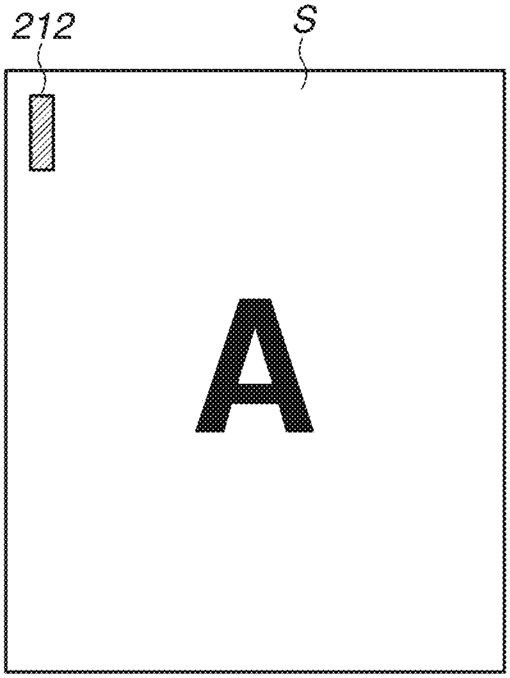

As illustrated in FIG. 2B, a small print region 212 for the adhesive toner Tn may be formed near a corner of each sheet S. In this case, a corner-bound booklet is formed. The image developed with the adhesive toner Tn is not formed on the sheet S that serves as the front cover of the booklet.

As illustrated in FIG. 1, a switching guide 33 is a flap-shaped guide member positioned downstream of the fixing device 6 in the conveyance direction of the sheet S. In a case where a single-sided print mode of forming an image on one side of the sheet S is selected, the switching guide 33 guides the sheet S to discharge rollers 34. In a case where a double-sided print mode of forming an image on both sides of the sheet S is selected, the switching guide 33 guides the sheet S with an image formed on its first surface to a switchback roller pair 35. The switchback roller pair 35 conveys the sheet S in a first direction. When the trailing edge of the sheet S becomes ready to enter a double-sided conveying path 36, the switchback roller pair 35 starts reverse rotation. This conveys the sheet S to the double-sided conveying path 36. The double-sided conveying path 36 conveys the sheet S to the secondary transfer portion again. Consequently, an image is formed on a second surface of the sheet S.

The discharge rollers 34 convey the sheet S to the intermediate conveyance unit 200. The intermediate conveyance unit 200 includes conveyance roller pairs 201 and 202. The conveyance roller pairs 201 and 202 convey the sheet S to the post-processing apparatus 300.

(2) Post-Processing Apparatus

The post-processing apparatus 300 is a floor-standing sheet processing apparatus. The post-processing apparatus 300 has a function of buffering a plurality of sheets, a function of aligning the plurality of sheets, and a function of bonding a sheet bundle.

Hereinafter, an edge portion of the sheet S that is on the front side in the conveyance direction will be referred to as "leading edge". An edge portion of the sheet S that is on the rear side in the conveyance direction will be referred to as "trailing edge". One of the two edge portions of the sheet S that enters the post-processing apparatus 300 first will be referred to as "first edge". The other one of the two edge portions of the sheet S that enters the post-processing apparatus 300 later will be referred to as "second edge". It should be noted that switchback conveyance performed by the post-processing apparatus 300 may change the leading edge from the first edge to the second edge and change the trailing edge from the second edge to the first edge.

The sheet S conveyed from the intermediate conveyance unit 200 is passed to entry rollers 21 of the post-processing apparatus 300. A sheet sensor referred to as a sheet sensor 27 is positioned downstream of the entry rollers 21. When the trailing edge of the sheet S is detected by the sheet sensor 27, a conveyance roller pair 22 accelerates the sheet S. When the trailing edge of the sheet S for which an upper tray 25 is set as its discharge destination reaches a region between the conveyance roller pairs 22 and 24, the conveyance roller pair 22 is decelerated. Consequently, the conveyance speed of the sheet S changes to a predetermined discharge speed. The conveyance roller pair 22 discharges the sheet S to the upper tray 25.

When the trailing edge of the sheet S for which a lower tray 37 is set as its discharge destination exits a reverse feed prevention valve 23, the conveyance roller pair 22 stops conveying the sheet S. Subsequently, the conveyance roller pair 22 starts reverse rotation.

Consequently, the sheet S is reversed and conveyed to a conveyance roller pair 26. When the leading edge of the sheet S is detected by a sheet sensor 60 positioned downstream of the conveyance roller pair 26, two rollers that constitute the conveyance roller pair 24 are separated. Consequently, the conveyance roller pair 24 becomes ready to receive the subsequent sheet S. Furthermore, the conveyance roller pair 26 is stopped in a state where the preceding sheet S is nipped by the conveyance roller pair 26. The conveyance roller pair 26 starts reverse rotation in synchronization with the arrival of the subsequent sheet S. Consequently, the subsequent sheet S is layered on the preceding sheet S. As a result of the conveyance roller pair 26 performing repeated sheet reversal, the plurality of sheets S is layered, thereby forming a sheet bundle. Such a sheet bundle forming operation may be referred to as a buffer operation. A unit that realizes the buffer operation will be referred to as a buffer unit 80.

When the sheet bundle is completed by the buffer unit 80, the conveyance roller pair 26 conveys the sheet bundle to an intermediate stacking portion 42. The sheet bundle passes through a conveyance roller pair 28 and a sheet sensor 50. Furthermore, the sheet bundle is conveyed to the intermediate stacking portion 42 by an ejection roller 29. A longitudinal alignment plate 39 configured to move is positioned at a stand-by position at the most downstream part of the intermediate stacking portion 42. The sheet bundle is pushed against the longitudinal alignment plate 39, thereby aligning the sheet bundle.

The plurality of sheet bundles is sequentially stacked on the intermediate stacking portion 42. Consequently, a predetermined number of sheets S used to form a booklet are stacked on the intermediate stacking portion 42. Upon completion of alignment of the predetermined number of sheets S, a heat and pressure bonding unit 51 performs a binding operation (bonding process), thereby forming a booklet.

The longitudinal alignment plate 39 moves from the stand-by position to a discharge position, thereby pushing the booklet to discharge rollers 38. When the leading edge of the booklet is nipped by the discharge rollers 38, the longitudinal alignment plate 39 stops and returns to the stand-by position again. The discharge rollers 38 discharge the booklet received from the longitudinal alignment plate 39 to the lower tray 37 through a discharging port 46.

In the foregoing description, the post-processing apparatus 300 forms a sheet bundle composed of a plurality of sheets S using the buffer unit 80 and conveys the sheet bundle to the intermediate stacking portion 42. However, a single sheet S may be conveyed to the intermediate stacking portion 42.

(3) Buffer Operation (Layering Operation)

The buffer operation is an operation that causes the buffer unit 80 to suspend receiving a subsequent sheet or sheet bundle until post-processing on the preceding sheet bundle at the intermediate stacking portion 42 is completed. The buffer operation enables the image forming system 1 to continue an image forming job including post-processing without decreasing the productivity (the number of images output per unit time) of the image forming apparatus 100.

FIG. 3A to FIG. 3G illustrate the buffer operation. In FIG. 3A to FIG. 3G, a sheet S that is conveyed first is denoted by "S1". A sheet S that is conveyed second is denoted by "S2".

A sheet bundle that is formed by layering the sheets S1 and S2 is denoted by "W".

The conveyance speeds of the conveyance roller pairs 22, 24, and 26 are denoted by "V1" and "V2" (V1<V2). The conveyance speed V1 is the pre-acceleration conveyance speed, and the conveyance speed V2 is the post-acceleration conveyance speed. As used herein, the term "acceleration"

(an increase in speed) refers to an acceleration process for maintaining the required sheet spacing (hereinafter, referred to as "sheet interval") when sheets S are being layered at the buffer unit 80 and when sheet bundles are being conveyed downstream. The sheet spacing generally refers to the distance or conveyance time from the trailing edge of a preceding sheet Si to the leading edge of a subsequent sheet Si+1 (where i is an arbitrary integer).

Figures 3A, 3B, 3C, 3D:
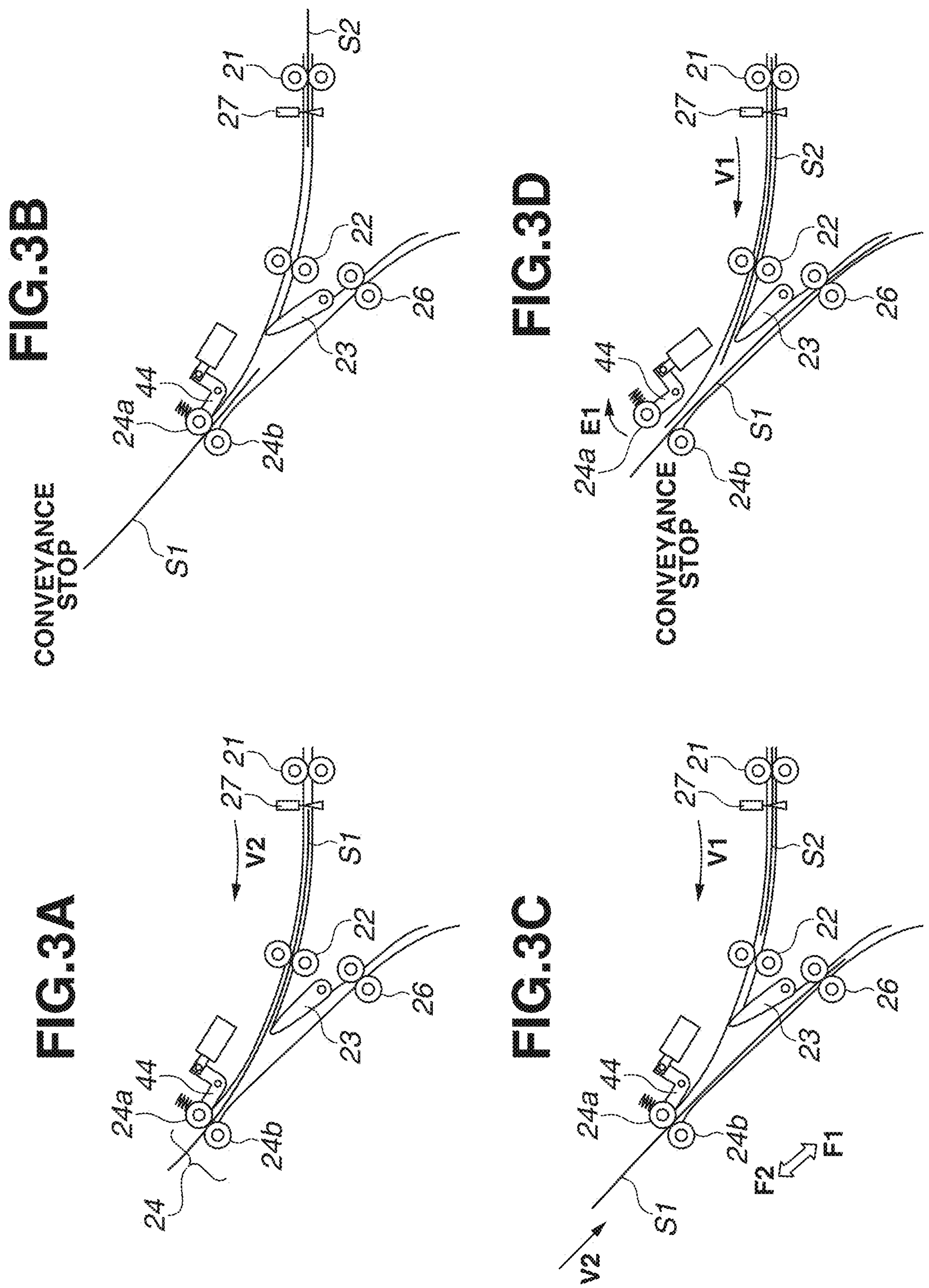
FIGS. 3A to 3H are diagrams illustrating a buffer operation.

FIG. 3A illustrates that the conveyance speeds of the conveyance roller pair 22 and the conveyance roller pair 24 are increased to V2 at the moment the trailing edge (second edge) of the sheet S1 passes through the sheet sensor 27.

FIG. 3B illustrates that the sheet S1 is temporarily stopped at the moment the trailing edge of the sheet S1 exits the reverse feed prevention valve 23 after being moved by a predetermined distance from the sheet sensor 27. The conveyance speed of the conveyance roller pair 22 returns to V1 to receive the sheet S2. FIG. 3C illustrates that the rotation direction of the conveyance roller pair 24 is switched from forward rotation to reverse rotation and the sheet S1 is conveyed in an F1 direction at the conveyance speed V2. The sheet S2 is conveyed to the conveyance roller pair 22 at the conveyance speed V1.

FIG. 3D illustrates that the leading edge (second edge) of the sheet S1 is conveyed by a predetermined amount from the conveyance roller pair 26 and stopped at that position. Further, a separation lever 44 separates an upper roller 24*a* in an E1 direction at the moment the sheet S1 is nipped by the conveyance roller pair 26. After the upper roller 24*a* is separated from a lower roller 24*b*, the leading edge (first edge) of the sheet S2 passes through the conveyance roller pair 24. The separation lever 44 is connected to a plunger solenoid 45 via a solenoid connection shaft so that the separation lever 44 can rotate freely. In a case where current flows in the plunger solenoid 45, the separation lever 44 rotates in the E1 direction, and the conveyance roller pair 24 switches to a separation state. In a case where the supply of current to the plunger solenoid 45 stops, the upper roller 24*a* is moved in an E2 direction by a pressurizing spring.

Figure 3E:
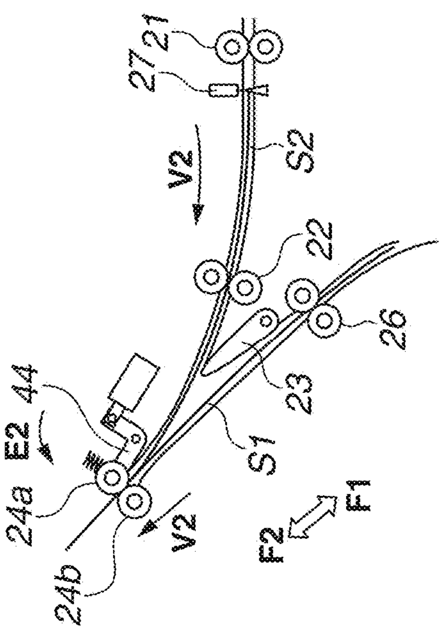

FIG. 3E illustrates that the conveyance speeds of the conveyance roller pair 22 and the conveyance roller pair 24 are increased to V2 after the trailing edge (second edge) of the sheet S2 has passed through the sheet sensor 27. The conveyance roller pair 26 starts reverse rotation at the moment the trailing edge (second edge) of the sheet S2 passes through the sheet sensor 27. Consequently, the sheet S1 nipped by the conveyance roller pair 26 is conveyed in an F2 direction. At the moment the conveyance speeds of the sheets S1 and S2 become equal, the upper roller 24*a* moves in the E2 direction and nips the sheets S1 and S2 by cooperating with the lower roller 24*b*. The conveyance speed (peripheral speed) of the conveyance roller pair 24 is adjusted to V2, which is the conveyance speed of the sheets S1 and S2, before the conveyance roller pair 24 nips the sheets S1 and S2.

Figure 3F:
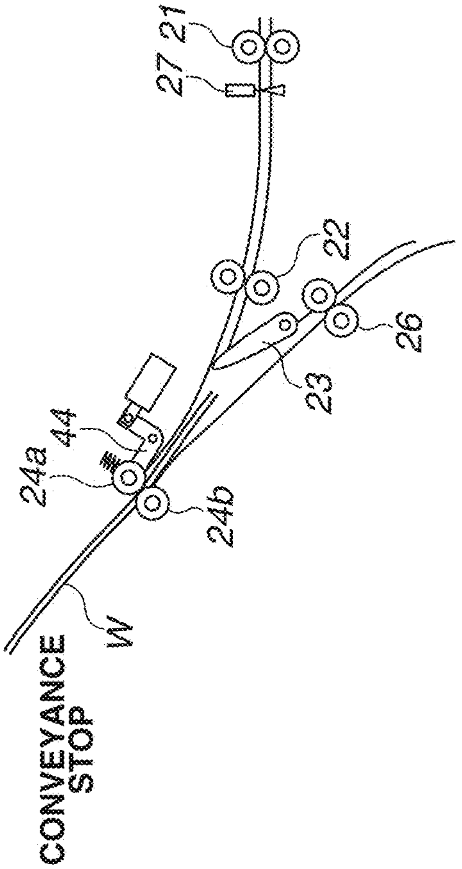

FIG. 3F illustrates that a sheet bundle W is formed by the sheets S1 and S2 after the trailing edge (second edge) of the sheet S2 has passed through the reverse feed prevention valve 23. In FIG. 3F, at the moment the trailing edge of the sheet bundle W exits the reverse feed prevention valve 23, the sheet bundle W is temporarily stopped, and the rotation direction of the conveyance roller pair 24 is switched from forward rotation to reverse rotation, as in FIGS. 3B and 3C.

Figure 3G:
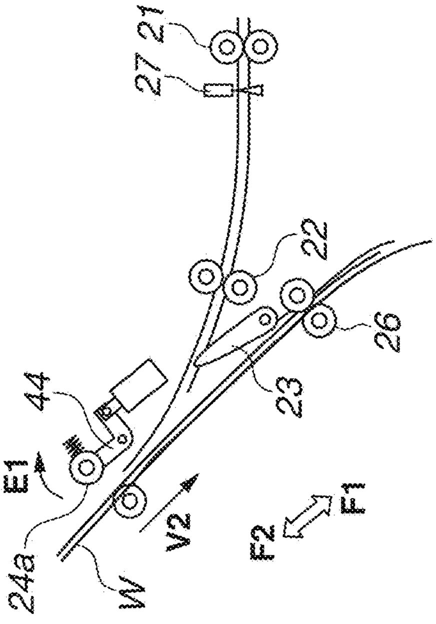

FIG. 3G illustrates that the sheet bundle W is conveyed at the conveyance speed V2 in the F1 direction toward a post-processing portion 71. At the moment the sheet bundle W is nipped by the conveyance roller pair 26, the separation lever 44 separates the upper roller 24*a* from the lower roller 24*b*. In other words, the upper roller 24*a* moves in the E1 direction.

Figure 3H:
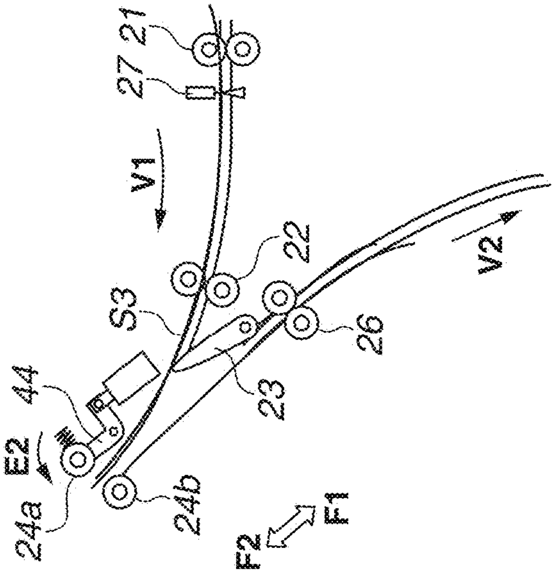

FIG. 3H illustrates that a sheet S3 is buffered after the sheet bundle W has been conveyed to the post-processing portion 71. In this case, the upper roller 24*a* temporarily stops after the trailing edge of the sheet bundle W has exited the conveyance roller pair 24. While the conveyance roller pair 24 is in the separation state, the sheet S3 enters the conveyance roller pair 24. It should be noted that when the trailing edge of the sheet S3 exits the sheet sensor 27, the conveyance speed of the conveyance roller pair 22 is increased from V1 to V2. Subsequently, the upper roller 24*a* moves in the E2 direction, thereby switching the conveyance roller pair 24 to a contact state. The rotation direction of the upper roller 24*a* is switched from reverse rotation to forward rotation, and the sheet S3 is conveyed at the conveyance speed V2 in the F2 direction. It should be noted that the conveyance roller pair 24 starts conveying the sheet S3 before the trailing edge of the sheet S3 exits the conveyance roller pair 22.

While two sheets S1 and S2 are buffered herein, this is merely an example.

In the case of also buffering the third sheet S3, the sheet bundle W is stopped at a position (temporary stop position) where the leading edge of the sheet bundle W has been conveyed by a predetermined amount from the conveyance roller pair 26 after FIG. 3G. Subsequently, a layering operation is applied to the sheet bundle W and the sheet S3. This layering operation is similar to the layering operation applied to the sheets S1 and S2 as described above with reference to FIG. 3D to FIG. 3G.

A number-of-sheets control unit 412 manages the number N of sheets S buffered by the buffer unit 80 during a print job involving continuous printing of a plurality of pages, based on the maximum number M of sheets S that can be buffered by the buffer unit 80 and conveyance information about sheets S. The number-of-sheets control unit 412 determines whether the sheet bundle W formed by the buffer unit 80 is to be discharged downstream or a subsequent sheet S is to be layered on the sheet bundle W. In the embodiment, it is assumed that the maximum number M of sheets is five.

(4) Alignment Operation

FIG. 4A to FIG. 4D illustrate an alignment operation performed on sheets S at the intermediate stacking portion 42. An initial state is a state where the intermediate stacking portion 42 is empty. For example, the sheet bundle W consisting of five sheets S is conveyed from the buffer unit 80 to the intermediate stacking portion 42.

A Y direction is a direction that is parallel to a stacking surface (stacking plate) of a sheet S at the intermediate stacking portion 42 and is also parallel to the conveyance direction of the sheet S conveyed from the ejection roller 29 to the intermediate stacking portion 42. The Y direction may also be referred to as "longitudinal direction". An X direction is a direction that is parallel to the stacking surface of the sheet S at the intermediate stacking portion 42 and is perpendicular to the Y direction. The X direction may also be referred to as "lateral direction". A Z direction is a direction perpendicular to the X and Y directions (a direction normal to the stacking surface, a thickness direction of a stacked sheet S). The Z direction may also be referred to as "height direction". The directions opposite to the X, Y, and Z directions are sometimes referred to also as "−X direction", "−Y direction", and "−Z direction", respectively.

The longitudinal alignment plate 39 and a longitudinal alignment roller 40 function as a first alignment unit that aligns a plurality of sheets S in the first direction (the Y direction). The longitudinal alignment plate 39 is positioned at the most downstream part of the intermediate stacking portion 42 in the Y direction. The longitudinal alignment plate 39 is a reference member (first reference member) serving as a reference for sheet position in the Y direction. The longitudinal alignment roller 40 is a conveyance member configured to convey a sheet S in the Y direction and push the sheet S against the longitudinal alignment plate 39 to align the sheet S. The longitudinal alignment plate 39 includes a plurality of contact portions 39*a* to 39*c* spaced apart along the X direction. The plurality of contact portions 39*a* to 39*c* are brought into contact with the edge portions of the sheets S. It should be noted that the longitudinal alignment plate 39 and the longitudinal alignment roller 40 are integrated as a movable unit 59 configured to move in the Y direction. The movable unit 59 can be moved in the Y direction by a driving source such as a motor. In other words, the positions of the longitudinal alignment plate 39 and the longitudinal alignment roller 40 in the Y direction are adjustable. Lateral alignment joggers 41*a* to 41*c* function as a second alignment unit that aligns sheets in a second direction (the X direction) perpendicular to the first direction.

The lateral alignment joggers 41*a* to 41*c* are moved in the X direction by a driving source such as a motor and push the side edges of sheets S stacked on the intermediate stacking portion 42. Lateral alignment plates 72*a* and 72*b* are reference members that serve as a reference for position of sheets S in the X direction. The lateral alignment plates 72*a* and 72*b* are positioned to face the lateral alignment joggers 41*a* and 41*b* in the X direction.

(4-1) Preparation Stage

Figure 4A:
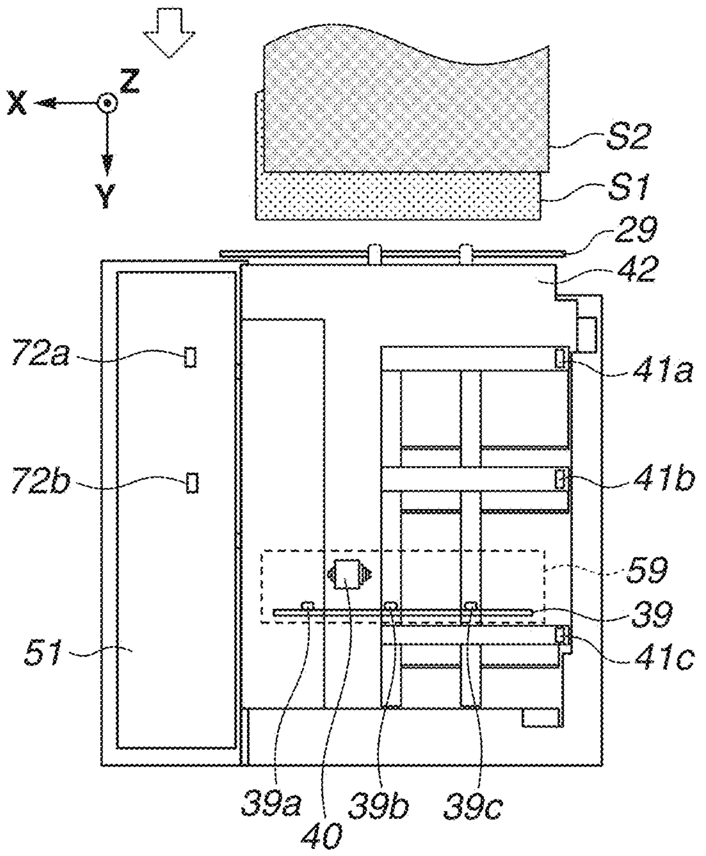
FIGS. 4A to 4D are diagrams illustrating an alignment operation and a bonding operation.

As illustrated in FIG. 4A, sheets S1 to S5 are conveyed to the ejection roller 29. The sheets S1 to S5 may be conveyed to the intermediate stacking portion 42 with a lower sheet Si extending from an upper sheet Si+1 in the Y direction. The longitudinal alignment plate 39 moves to a predetermined stand-by position in advance to fit the sizes of the alignment target sheets S before the sheets S are stacked on the intermediate stacking portion 42. The stand-by position is set so that the edge positions of the sheets S in the −Y direction are consistent without depending on the sizes of the sheets S. In other words, the stand-by position is a position where the distance from a nip position of the ejection roller 29 to the longitudinal alignment plate 39 in the Y direction is slightly longer than the sheet length in the Y direction. The lateral alignment joggers 41*a* to 41*c* stand by outside a sheet S being conveyed in the X direction to avoid hindering conveyance of the sheet S.

(4-2) Longitudinal Alignment Stage

Figure 4B:
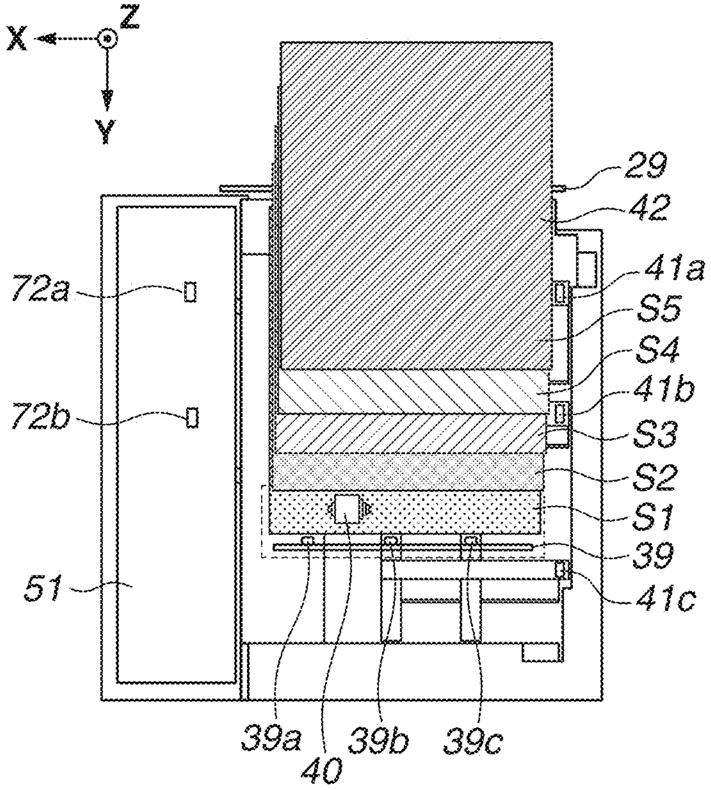

FIG. 4B illustrates that the trailing edge of the first sheet S1 has exited the nip of the ejection roller 29 and the leading edge of the sheet S1 has reached the longitudinal alignment roller 40. The sheet S1 is pushed against the longitudinal alignment plate 39 and aligned using the position of the longitudinal alignment plate 39 as a reference. The longitudinal alignment roller 40 continues rotating, thereby sequentially pushing the sheets S2 to S5, which reach the longitudinal alignment roller 40 following the sheet S1, against the longitudinal alignment plate 39. Consequently, the five sheets S1 to S5 are aligned with respect to the Y direction (the longitudinal direction) using the position of the longitudinal alignment plate 39 as a reference.

(4-3) Lateral Alignment Stage

Figure 4C:
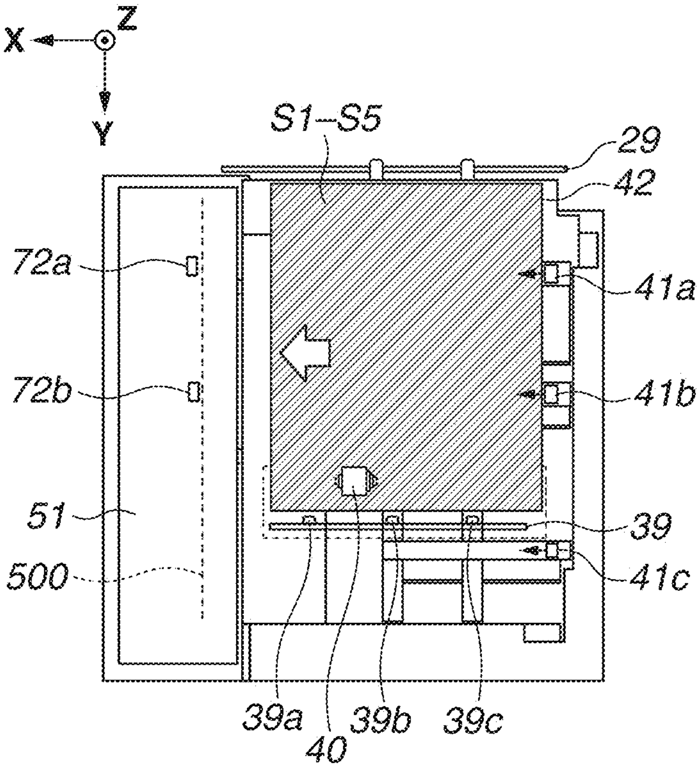

FIG. 4C illustrates that alignment in the X direction (the lateral direction) starts after alignment of the sheets S1 to S5 in the Y direction (the longitudinal direction) is completed. The lateral alignment joggers 41*a* to 41*c* are driven in the X direction, which is the alignment direction, and brought into contact with side edges of the sheets S1 to S5 to push the sheets S1 to S5 toward the lateral alignment plates 72*a* and 72*b*. Consequently, other side edges of the sheets S1 to S5 are brought into contact with a contact surface 500 of the lateral alignment plates 72*a* and 72*b*, thereby aligning the sheets S1 to S5 with respect to the X direction (the lateral direction) using the positions of the lateral alignment plates 72*a* and 72*b* as a reference.

(4-4) Bonding Stage (Heat and Pressure Bonding Stage)

Figure 4D:
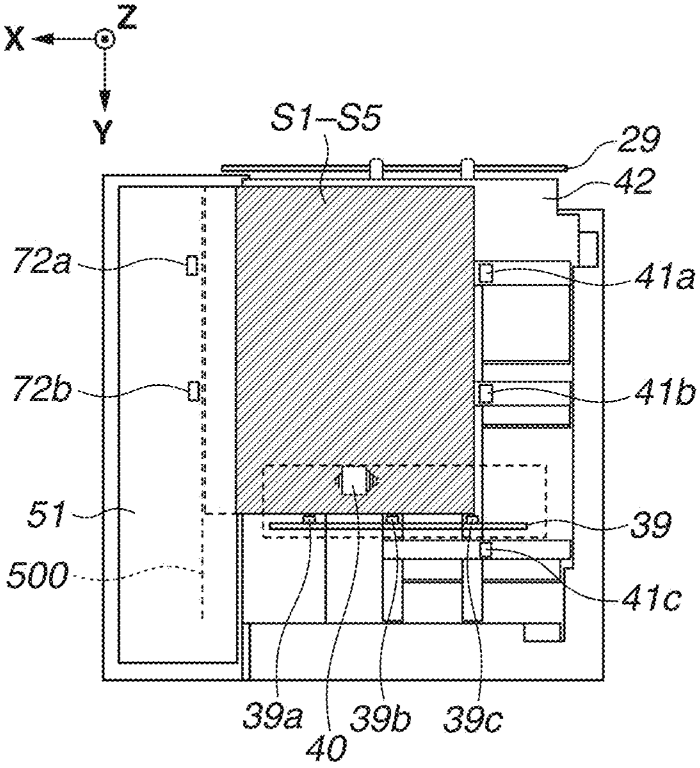

FIG. 4D illustrates a state after alignment of the five sheets S1 to S5 in the X and Y directions has been completed. A target position (alignment position) in the alignment operation is the position of the sheet bundle W during the bonding process (heat and pressure bonding) by the heat and pressure bonding unit 51. As described above, the image forming apparatus 100 applies the adhesive toner Tn to the sheets S1 to S5 so that the side where the adhesive toner images are formed faces the heat and pressure bonding unit 51. In a case where the sheet S1 is the front cover of a booklet, the adhesive toner Tn is not applied.

The heat and pressure bonding unit 51 applies a heat and pressure bonding operation to the aligned sheets S1 to S5. Meanwhile, the lateral alignment joggers 41*a* to 41*c* are retracted in the −X direction. Consequently, the intermediate stacking portion 42 becomes ready to receive a subsequent plurality of sheets S. Subsequently, a sheet bundle W consisting of sheets S6 to S10 and generated by the buffer unit 80 is stacked on the sheets S1 to S5.

Subsequently, the four stages described above are repeated on the sheets S1 to S10. Consequently, the sheets S1 to S10 are bonded in a precisely aligned state.

For example, each sheet bundle W consists of five sheets S. However, the number of sheets S of a sheet bundle W may be two, three, or the like. In other words, the number of sheets S of a sheet bundle W may be any number less than or equal to the maximum number of sheets S that can be layered at the buffer unit 80.

(5) Heat and Pressure Bonding Unit

Figure 5A:
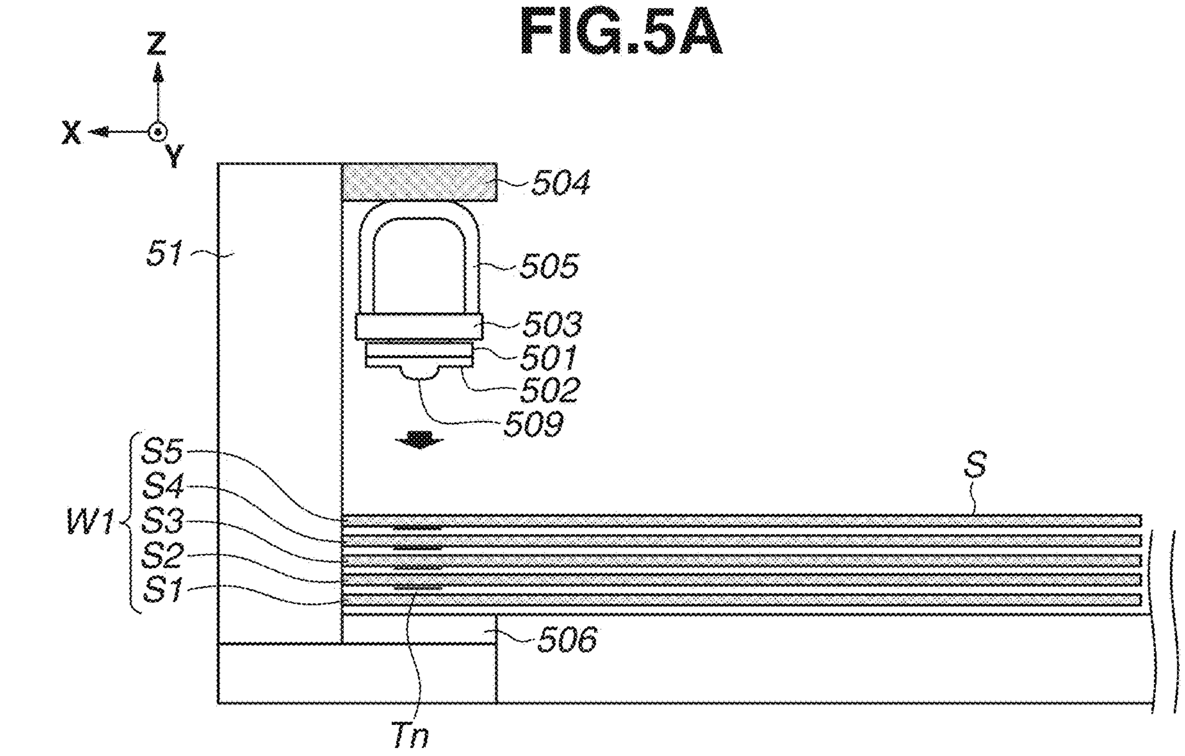
FIGS. 5A and 5B are diagrams illustrating a bonding operation.

As illustrated in FIG. 5A, the heat and pressure bonding unit 51 includes a heater 501 and a heating plate 502. The heater 501 includes a heat generating member as a heating source, and the heating plate 502 is made of aluminum and placed on the heater 501. The heater 501 is, for example, a ceramic heater. The temperature of the heater 501 may be measured by a temperature sensor and controlled by a control circuit to adjust the measured temperature to a target temperature. For example, the target temperature is set so that the surface temperature of a pressurizing portion 509 of the heating plate 502 reaches 200° C. Wi-th the pressurizing portion 509 provided to the heating plate 502, heat and pressure of the heat and pressure bonding unit 51 are concentrated on the binding position of the sheet bundle W. As a result, the efficiency of heating and pressurizing improves.

The heater 501 is supported by a heater support member 503 made of resin. A pressurizing lever 504 receives motive power from a motor M8 illustrated in FIG. 6 to push the heat and pressure bonding unit 51 downward in the −Z direction (downward direction) and pressurize the sheet bundle W. The pressure of the pressurizing lever 504 is transmitted to the pressurizing portion 509 via a metal stay 505 as a rigid body. The pressure of the pressurizing lever 504 can be controlled based on an amount by which the pressurizing lever 504 is moved in the −Z direction (downward direction). For example, the pressure is 30 kgf.

A pressurizing plate 506 is made of an elastic material (e.g., silicon rubber). This is because the pressurizing plate 506 is a member configured to receive pressure with stability. The heat and pressure bonding unit 51 pressurizes a sheet bundle W1 consisting of the sheets S1 to S5 and subsequently separates from the sheet bundle W1. The sheets S1 to S5 in FIG. 5A represent the first to fifth sheets of a booklet as a deliverable. The sheet S1 is the front cover of the booklet. Thus, no bonding pattern image of the adhesive toner Tn is formed on the sheet S1. On each lower surface of the second and subsequent sheets S2 to S5 of the booklet, an image of the adhesive toner Tn is formed.

Figure 5B:
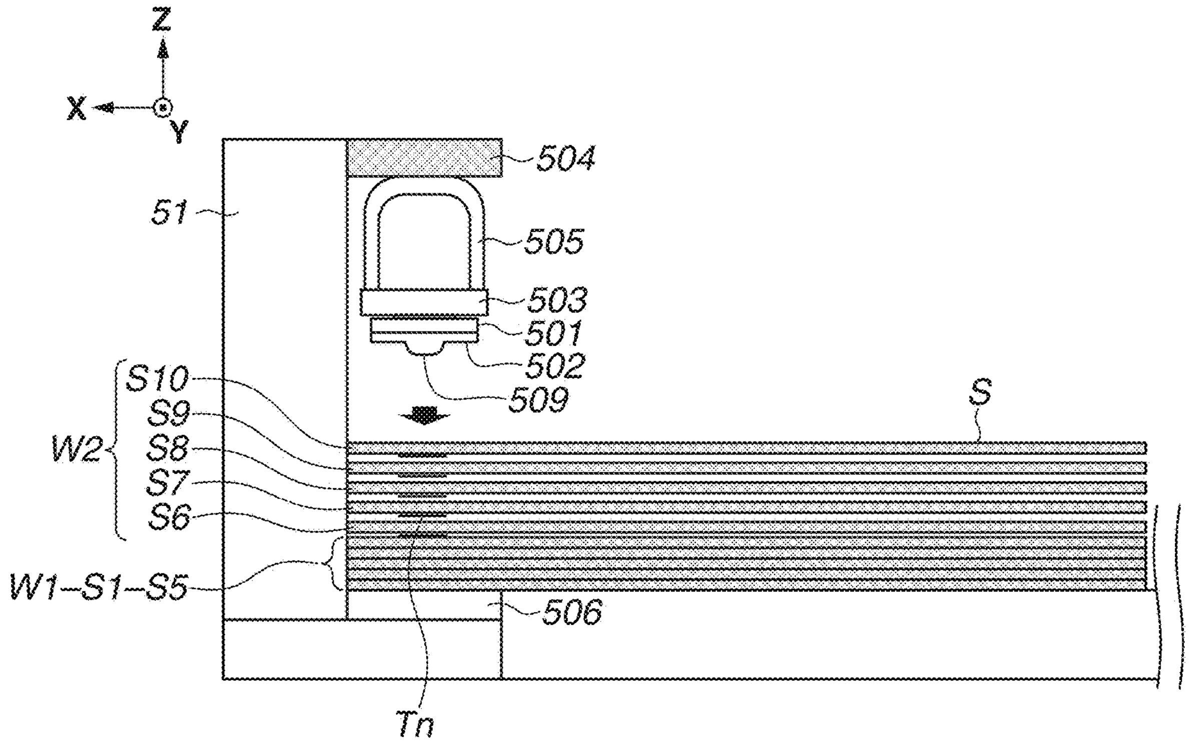

As illustrated in FIG. 5B, a sheet bundle W2 is stacked on the sheets S1 to S5 having been bonded using heat and pressure. The sheet bundle W2 consists of sheets S6 to S10. The heat and pressure bonding unit 51 applies the heat and pressure bonding operation to the sheet bundle W2 stacked on the sheet bundle W1. Consequently, a booklet consisting of a large number of sheets S is generated.

The subsequently stacked sheets S6 to S10 are to be included in the same booklet as the sheets S1 to S5. Thus, an image of the adhesive toner Tn is formed on each lower surface of the sheets S6 to S10.

For example, the post-processing apparatus 300 can generate a single booklet consisting of a maximum of 100 sheets S. Once booklet generation is started, the buffer unit 80 generates a sheet bundle W by buffering a maximum of five sheets S and feeds the sheet bundle W to the intermediate stacking portion 42. Each time a sheet bundle W is received, the heat and pressure bonding unit 51 performs the heat and pressure bonding operation including a lowering operation, a pressurizing operation, and an elevating operation. By repeating the buffer operation and the heat and pressure bonding operation, an efficient booklet is generated without decreasing the productivity of the image forming apparatus 100.

Upon completion of the heat and pressure bonding operation on a sheet bundle W including the last page of the booklet at the intermediate stacking portion 42, the longitudinal alignment plate 39 moves from the stand-by position to the discharge position. In other words, the longitudinal alignment plate 39 moves in parallel toward the discharging port 46, thereby pushing out the completed booklet. The discharging port 46 is provided with the discharge rollers 38. When the leading edge of the booklet slightly crosses the discharge rollers 38, the longitudinal alignment plate 39 stops and returns to the stand-by position again. The discharge rollers 38 discharges the booklet onto the lower tray 37.

(6) Controller

Figure 6:
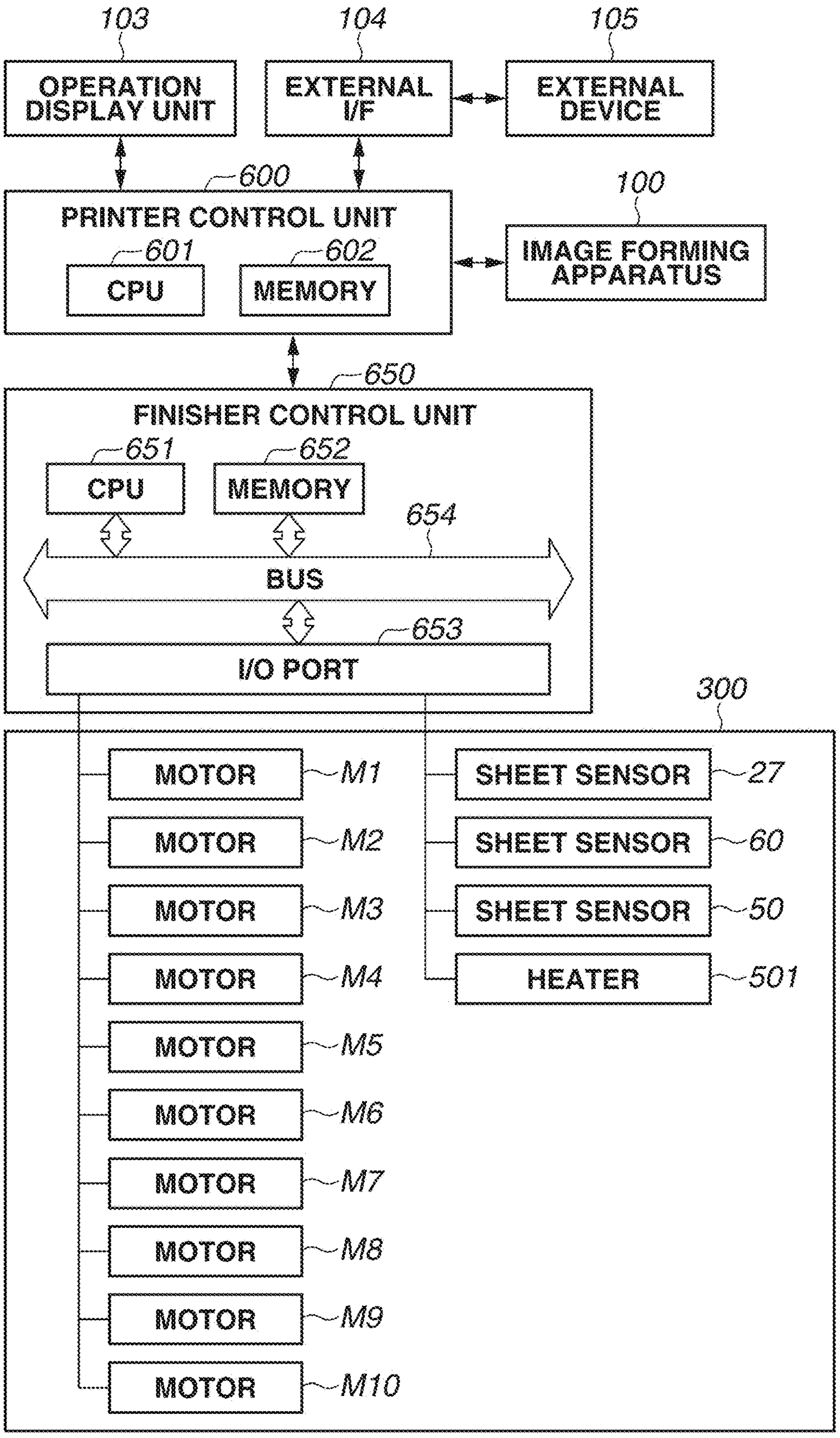
FIG. 6 is a diagram illustrating a controller.

FIG. 6 is a diagram illustrating controllers of the image forming system 1. A printer control unit 600 is a controller configured to control the image forming apparatus 100. A finisher control unit 650 is a controller configured to control the post-processing apparatus 300. The printer control unit 600 and the finisher control unit 650 are connected to each other via a communication interface and cooperate to control the operation of the image forming system 1.

The printer control unit 600 includes a central processing apparatus (CPU) 601 and a memory 602. The CPU 601 reads a program stored in the memory 602, executes the program, and controls the image forming apparatus 100 according to the program. The CPU 601 performs processes of the image forming apparatus 100 such as an image forming process and a sheet conveyance process. The memory 602 includes a non-volatile storage medium, such as a read-only memory (ROM), and a volatile storage medium, such as a random access memory (RAM). The memory 602 stores a program and data and provides a working area during program execution by the CPU 601. The memory 602 is an example of a non-transitory storage medium storing a program for controlling the image forming apparatus 100.

The printer control unit 600 is connected to an external device 105, such as a personal computer and a mobile information device, via an external interface (I/F) 104. The printer control unit 600 receives commands, such as a command to execute an image forming job, input from the external device 105 to the image forming system 1. The printer control unit 600 is connected to an operation display unit 103, which is a user interface of the image forming system 1. The operation display unit 103 includes a display apparatus (e.g., a liquid crystal panel configured to present information to a user, or the like) and an input apparatus (e.g., a physical button and a touch sensor configured to receive a user input operation). The printer control unit 600 controls the content displayed on the display apparatus and receives information input via the input apparatus by communicating with the operation display unit 103.

The finisher control unit 650 includes a CPU 651, a memory 652, and an input/output (I/O) port 653. The CPU 651 reads a program stored in the memory 652, executes the program, and controls the post-processing apparatus 300 according to the program. The memory 652 includes a non-volatile storage medium (e.g., a ROM, a solid state drive (SSD), a hard disk drive (HDD)) and a volatile storage medium (e.g., a RAM). SSD is short for solid state drive. HDD is short for hard disk drive. The memory 652 stores a program and data and provides a working area during program execution by the CPU 651. The memory 652 is an example of a non-transitory storage medium storing a program for controlling the post-processing apparatus 300. The CPU 651, the memory 652, and the I/O port 653 are connected to one another via a bus 654. The I/O port 653 outputs a control signal to various components of the post-processing apparatus 300 and inputs a signal from the various components.

It should be noted that each function of the printer control unit 600 and the finisher control unit 650 may be implemented as independent hardware, such as an application-specific integrated circuit (ASIC), or as software, such as a program module. ASIC is short for application-specific integrated circuit. The printer control unit 600 may perform some or all of the functions of the finisher control unit 650.

The sheet sensors 27, 50, and 60 and the heater 501 are connected to the I/O port 653. Motors M1 to M10 as a driving source for conveying a sheet S and driving sources for the heat and pressure bonding unit 51 are connected to the I/O port 653.

The motor M1 drives and rotates the entry rollers 21. The motor M2 drives and rotates the conveyance roller pair 22. The motor M3 drives and rotates the conveyance roller pair 24. The motor M4 drives and rotates the conveyance roller pair 26. The motor M5 drives and rotates the ejection roller 29. The motor M6 supplies a driving force to cause the longitudinal alignment roller 40 to operate intermittently, one rotation at a time. The motor M7 moves the lateral alignment jogger 41 in the +X or −X direction. The motor M8 causes the heat and pressure bonding unit 51 to perform an operation to press and bond the sheet bundle W. The motor M9 drives and rotates the discharge rollers 38. The motor M10 drives the longitudinal alignment plate 39 in the +Y or −Y direction.

(7) Functional Configuration

Figure 7:
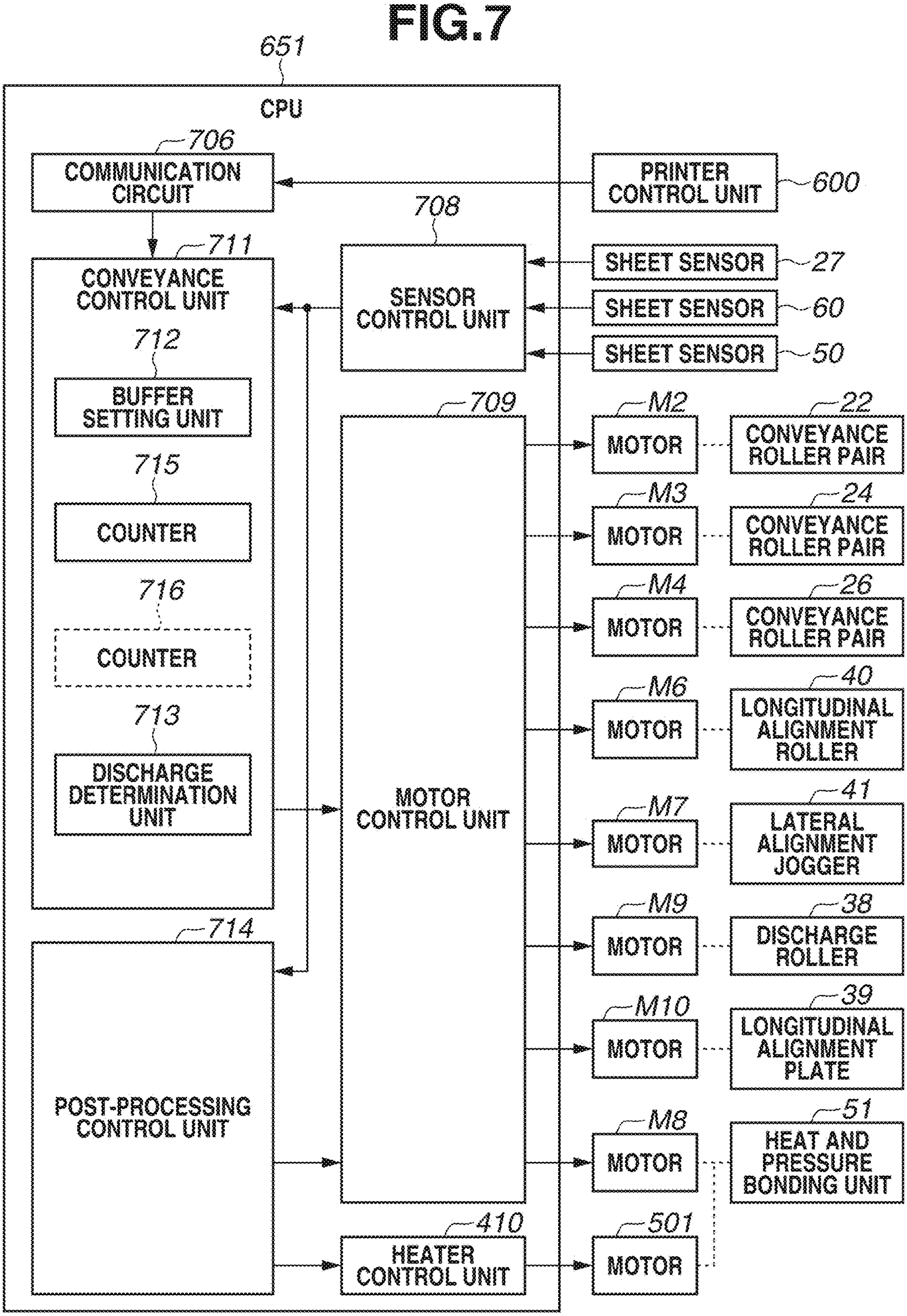
FIG. 7 is a diagram illustrating functions of a central processing unit (CPU) for booklet generation according to a first embodiment.

FIG. 7 illustrates functions realized by the CPU 651. The CPU 651 realizes a sensor control unit 708, a motor control unit 709, a heater control unit 710, and a conveyance control unit 711 according to a program. Some or all of these functions may be realized by an ASIC, a digital signal processor (DSP), a field programmable gate array (FPGA), or the like. The CPU 651 may include a communication circuit 706 configured to perform serial communication and the like.

The communication circuit 706 is connected to the printer control unit 600 and receives job information, information about a sheet S conveyed from the image forming apparatus 100, and the like. The communication circuit 706 issues an instruction, such as an instruction to temporarily stop an image forming job, to the printer control unit 600.

The sensor control unit 708 activates the sheet sensors 27, 50, and/or 60 and passes a signal input from the sheet sensors 27, 50, and/or 60 to the conveyance control unit 711. The conveyance control unit 711 instructs the motor control unit 709 to drive the motors M1 to M5 mainly based on an input from the sensor control unit 708. This realizes control of conveyance of a sheet S, a sheet bundle W, and a booklet. A post-processing control unit 714 instructs the motor control unit 709 to drive the motors M6 to M10 and instructs the heater control unit 710 to cause the heater 501 to start heating based on an input from the sensor control unit 708. This realizes post-processing, such as a longitudinal alignment process, a lateral alignment process, and a heat and pressure bonding operation.

The conveyance control unit 711 includes a buffer setting unit 712 and a discharge determination unit 713.

The buffer setting unit 712 sets a boundary between a preceding sheet bundle and a subsequent sheet bundle in the buffer unit 80. The discharge determination unit 713 may determine a boundary between a preceding booklet (k-th booklet) and a subsequent booklet ((k+1)th booklet). The buffer setting unit 712 may set a boundary between a preceding sheet bundle and a subsequent sheet bundle, for example, by setting the number of sheets S included in a sheet bundle W generated by the buffer unit 80. The discharge determination unit 713 may determine a boundary between a preceding booklet and a subsequent booklet by making a determination regarding the discharge of a booklet held at the intermediate stacking portion 42. A counter 715 counts the number i (i-th sheet) of sheets S stacked at the buffer unit 80. A counter 716 is used in a second embodiment and counts the number H of sheets stacked on the intermediate stacking portion 42.

(8) Continuous Generation of a Plurality of Booklets

The image forming system 1 can continuously generate a plurality of booklets. Upon receiving information about a job from the external device 105 via the communication circuit 706, the conveyance control unit 711 acquires the total number U of pages included in the job. It is assumed that the total number U does not exceed the maximum number Q (e.g., Q=100) of sheets S that can be stacked on the intermediate stacking portion 42. Further, the number of sheets S included in a single booklet is defined as M. The maximum number of sheets S included in a sheet bundle W generated by the buffer unit 80 is defined as N.

Figure 8:
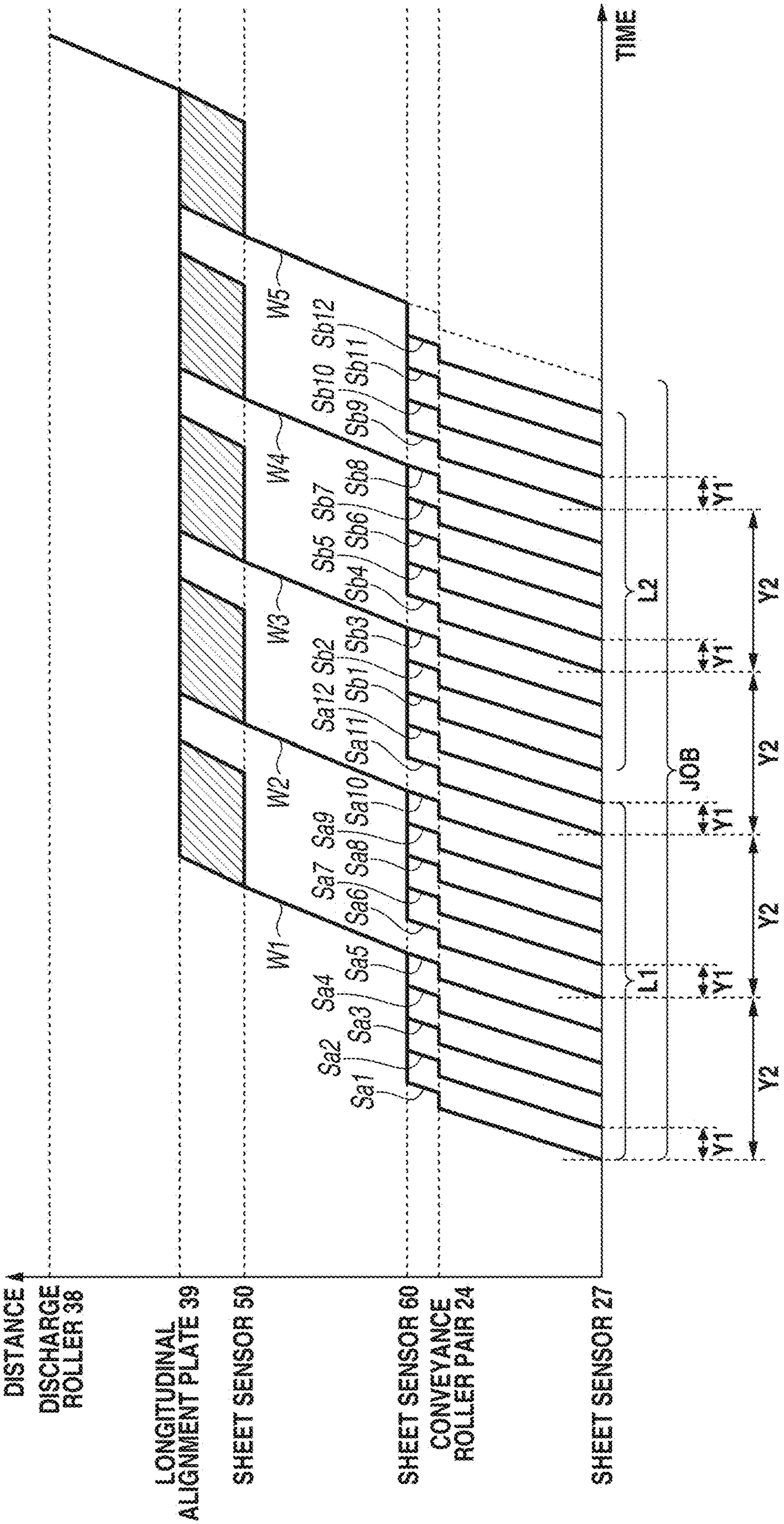
FIG. 8 is a diagram illustrating a timing chart according to the first embodiment.

FIG. 8 is a conveyance diagram illustrating sheets S during a job that generates two booklets L1 and L2 for which M=12. N is 5. The horizontal axis represents time. The vertical axis represents distance along the conveying path in the post-processing apparatus 300, with the entry rollers 21 as the origin point. In FIG. 8, the leading edge positions of sheets S are plotted.

A sheet S is conveyed from the image forming apparatus 100 at regular intervals. The buffer unit 80 forms a sheet bundle W consisting of five sheets S and conveys the sheet bundle W to the intermediate stacking portion 42. The intermediate stacking portion 42 performs post-processing (alignment and pressure bonding) each time a sheet bundle W is received.

The foregoing operations are repeated, thereby completing the booklets L1 and L2 at the intermediate stacking portion 42. Subsequently, the discharge rollers 38 discharge the booklets L1 and L2 together to the lower tray 37.

It should be noted that the switchback changes the conveyance direction of a sheet S downstream of the conveyance roller pair 24. In other words, the leading edge of the sheet S changes from the first edge to the second edge. Accordingly, the leading edge position of the sheet S in FIG. 8 after the sheet S is temporarily stopped by the conveyance roller pair 24 is the second edge position.

In FIG. 8, sheets Sa1 to Sa5 are buffered by the buffer unit 80, thereby forming a sheet bundle W1. The sheet bundle W1 is conveyed to the intermediate stacking portion 42, and the leading edges of the sheets Sa1 to Sa5 are aligned longitudinally by the longitudinal alignment plate 39. Furthermore, the lateral alignment process and the heat and pressure bonding operation are applied to the sheets Sa1 to Sa5.

In FIG. 8, the buffer operation by the buffer unit 80 is represented by a subsequent sheet S layered on a preceding sheet S held at the position of the sheet sensor 60. The second sheet bundle W2 to the fifth sheet bundle W5 are conveyed, aligned, and bonded with pressure, similarly to the sheet bundle W1. The sheets S are conveyed at intervals (sheet intervals) of Y1. The sheet bundles W are conveyed at intervals of Y2.

The sheet bundle W1 is held at the intermediate stacking portion 42 even after being bonded with heat and pressure at the intermediate stacking portion 42. The subsequent sheet bundles W2 to W5 are sequentially stacked on the sheet bundle W1. While the heat and pressure bonding operation is performed on the sheet bundles W2 to W5, the sheet bundle W1 undergoes the heat and pressure bonding operation. The sheet bundles W2 to W4 also undergo the heat and pressure bonding operation a plurality of times. Thus, the leading edge positions of the sheet bundles W1 to W4 remain at the position of the longitudinal alignment plate 39 in FIG. 8.

The maximum number of sheets S included in a sheet bundle W is five. Accordingly, a last sheet Sa12 of the booklet L1 and a first sheet Sb1 of the booklet L2 are included in the sheet bundle W3. As illustrated in FIG. 8, the sheet bundle W3 includes sheets Sa11 and Sa12 of the booklet L1 and the sheets Sb1, Sb2, and Sb3 of the booklet L2.

The total number U of sheets S of a job is 24, which is not an integer multiple of N. Thus, the last sheet bundle W5 consists of four sheets Sb9 to Sb12, which is less than N.

Figure 9:
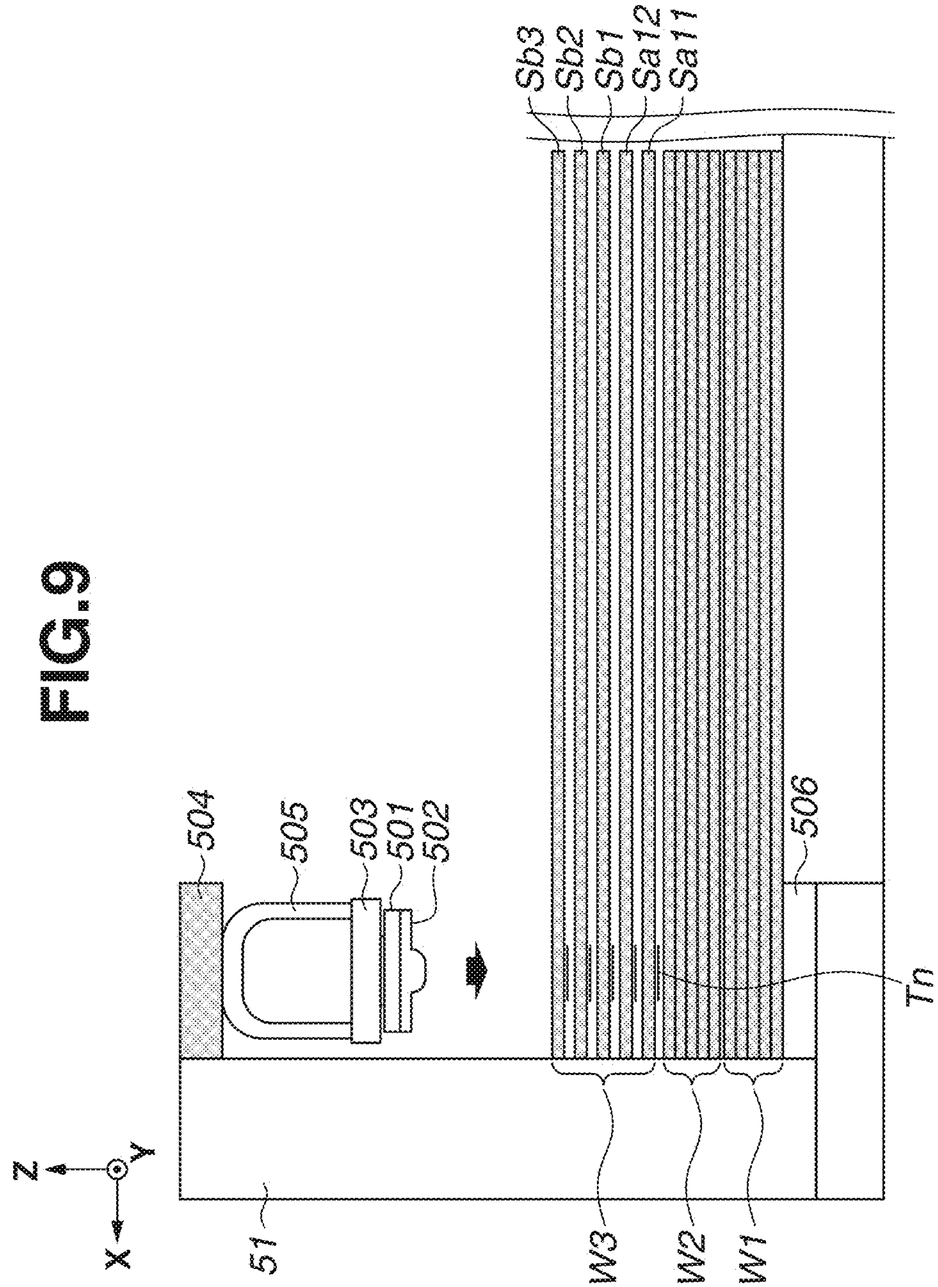
FIG. 9 is a diagram illustrating a bonding operation according to the first embodiment.

FIG. 9 is a cross-sectional view illustrating the heat and pressure bonding unit 51 at the point when the sheet bundle W3 is received by the heat and pressure bonding unit 51. The adjacent sheets S of the sheet bundles W1 and W2 have been bonded. No image of the adhesive toner Tn is formed on the sheet Sb1, which serves as the front cover of the booklet L2. Thus, performing the heat and pressure bonding operation in this state does not bond the sheet Sa12 of the booklet L1 and the sheet Sb1 of the booklet L2.

Meanwhile, the sheets Sa11 and Sa12 conveyed as the sheet bundle W3 are bonded to the sheet bundles W1 and W2 stacked below. Consequently, the booklet L1 is completed, and the booklet L1 and the booklet L2 are separated from each other.

As illustrated in FIG. 8, upon completion of the heat and pressure bonding operation on the sheet bundle W4 and the heat and pressure bonding operation on the sheet bundle W5, the stacked booklets L1 and L2 are discharged to the discharge rollers 38 by the longitudinal alignment plate 39. Consequently, the booklets L1 and L2 are discharged together to the lower tray 37.

(9) Flowchart

Figure 10A:
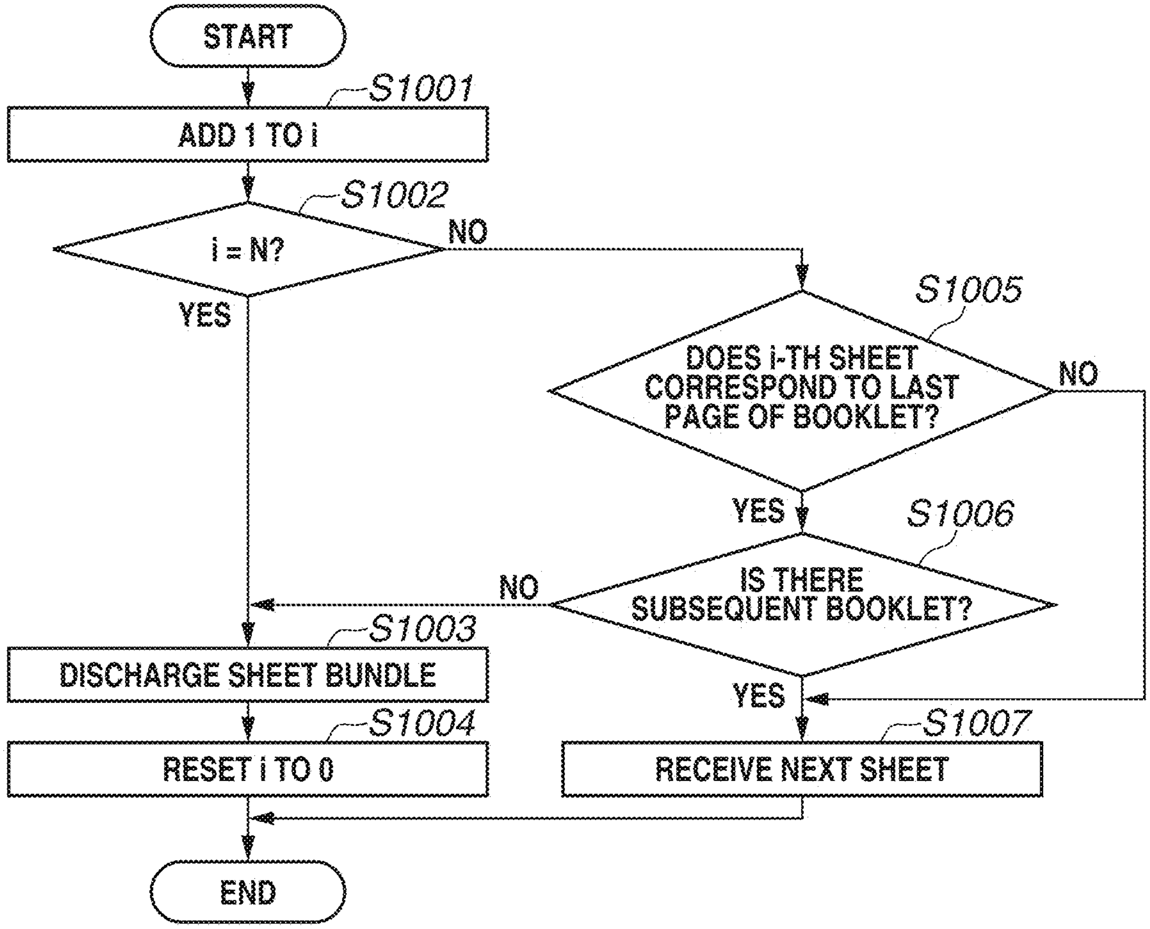
FIGS. 10A and 10B are flowcharts illustrating booklet generation according to the first embodiment.

FIG. 10A illustrates a process performed by the CPU 651 (the buffer setting unit 712). In a case where the trailing edge of a sheet S is detected by the sheet sensor 27, the following process is performed.

In step S1001, the CPU 651 adds one to a count value i of the counter 715, which counts the number of sheets S held by the buffer unit 80, thereby obtaining a count of i+1. The count value i is initialized to zero when an image forming job is started and when a sheet bundle W is discharged from the buffer unit 80 to the intermediate stacking portion 42.

In step S1002, the CPU 651 determines whether the count value i is equal to the maximum number N. In other words, the CPU 651 determines whether the number of sheets S buffered by the buffer unit 80 (the count value i) has reached the maximum number N. That is to say, the CPU 651 determines whether a sheet bundle W is completed. In a case where the count value i is equal to N (YES in step S1002), the processing proceeds from step S1002 to step S1003.

In step S1003, the CPU 651 discharges the sheet bundle W from the buffer unit 80 to the intermediate stacking portion 42. Specifically, the CPU 651 drives the conveyance roller pairs 26 and 28 and the ejection roller 29 and conveys the sheet bundle W to the intermediate stacking portion 42. In step S1004, the CPU 651 resets the count value i of the counter 715 to zero.

On the other hand, in a case where the count value i is less than N in step S1002 (NO in step S1002), the processing proceeds from step S1002 to step S1005. In step S1005, the CPU 651 determines whether the sheet S conveyed to the buffer unit 80 corresponds to the last page of the booklet, based on the information about the sheet S acquired by the communication circuit 706. In a case where the sheet S corresponds to the last page of the booklet (YES in step S1005), the processing proceeds from step S1005 to step S1006.

In step S1006, the CPU 651 determines whether there is a subsequent booklet, based on job information. It should be noted that the job information about the subsequent booklet is notified in advance to the finisher control unit 650 by the communication circuit 706. In a case where there is no subsequent booklet (NO in step S1006), the sheet bundle W is completed, so that the processing proceeds from step S1006 to step S1003. In other words, the sheet bundle W is discharged from the buffer unit 80 and conveyed to the intermediate stacking portion 42.

On the other hand, in a case where there is a subsequent booklet (YES in step S1006), the processing proceeds from step S1006 to step S1007. In step S1007, the CPU 651 causes the buffer unit 80 to continue receiving a subsequent sheet. In other words, the buffer operation continues.

Figure 10B:
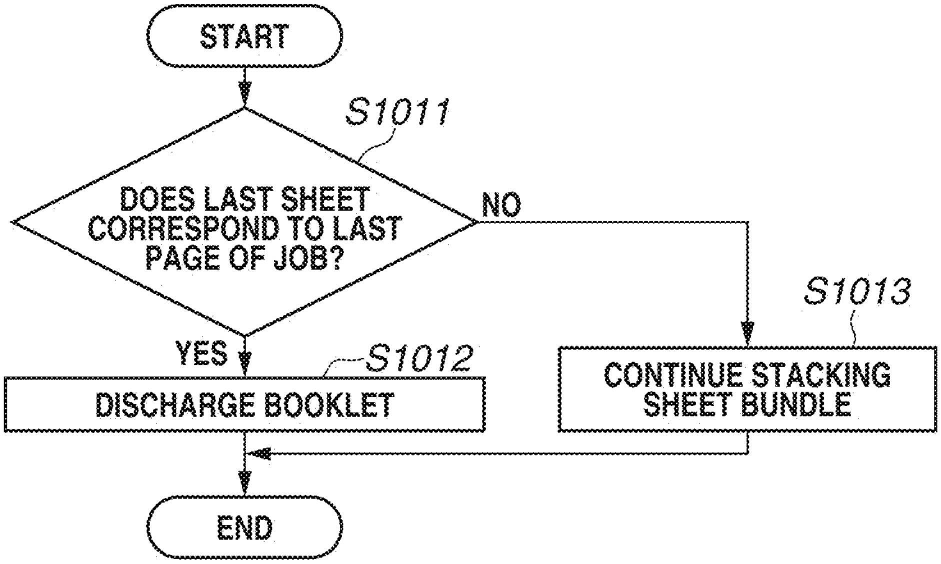

FIG. 10B illustrates a determination process performed by the CPU 651 (the discharge determination unit 713). In a case where the trailing edge of a sheet bundle W is detected by the sheet sensor 50, the following process is performed.

In step S1011, the CPU 651 determines whether the uppermost sheet S (the last sheet S buffered) of the sheet bundle W corresponds to the last page of the job. In a case where the sheet corresponds to the last page of the job (YES in step S1011), the processing proceeds from step S1011 to step S1012.

In step S1012, the CPU 651 discharges the booklet from the intermediate stacking portion 42 to the lower tray 37 upon completion of post-processing on the sheet bundle W because the booklet generation is completed at this point. The CPU 651 drives the motor M10 and pushes out the booklet using the longitudinal alignment plate 39. Furthermore, the CPU 651 drives the motor M9 and rotate the discharge rollers 38, thereby discharging up to the L-th booklet to the lower tray 37.

On the other hand, in a case where the last sheet S of the sheet bundle W does not correspond to the last page of the job (in a case where the (L+1)th booklet exists) (NO in step S1011), the processing proceeds from step S1011 to step S1013. In step S1013, the CPU 651 continues holding the sheet bundle W at the intermediate stacking portion 42 and stacking a subsequent sheet bundle W.

The first embodiment makes it possible to perform the heat and pressure bonding operation on the subsequent booklet L2 without discharging the preceding booklet L1 from the intermediate stacking portion 42 during a job that continuously generates a plurality of booklets. This makes it possible to continuously generate booklets without decreasing the productivity of the image forming system 1.

In the embodiment, a method for conveying a sheet S constituting a preceding booklet and a sheet S of a subsequent booklet in the same sheet bundle W in a case where a user image is on a rear cover of the preceding booklet or a front cover of the subsequent booklet will be described.

Figure 11:
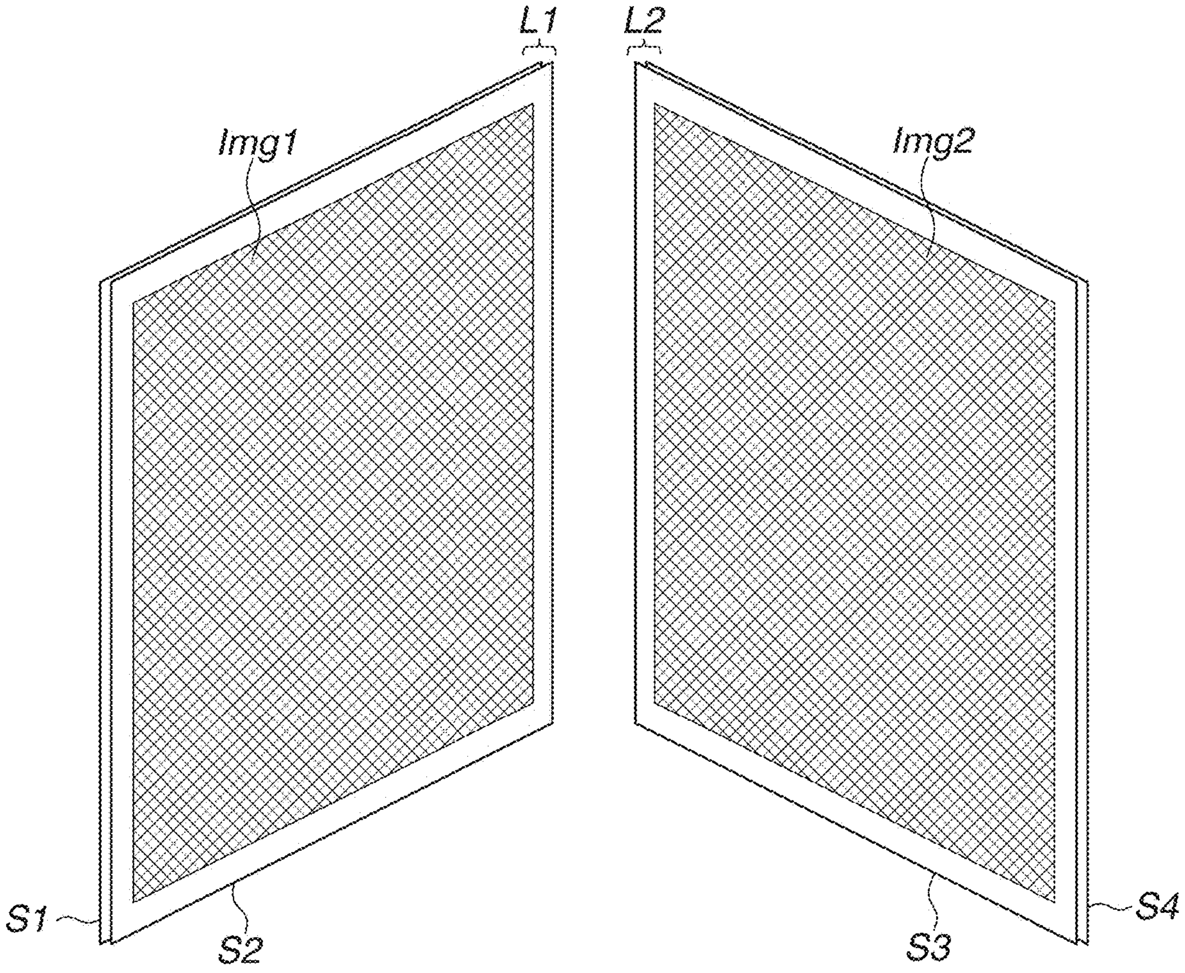
FIG. 11 illustrates an example of a booklet with an image on its front or rear cover.

FIG. 11 illustrates an example of a case where user images are on a rear cover of a preceding booklet and a front cover of a subsequent booklet. The booklets L1 and L2 are booklets each consisting of two sheets. A user image Img1 is printed on the entire last page (rear cover) of a sheet S2 of the booklet L1. Further, a user image Img2 is printed on the entire first page (front cover) of a sheet S3 of the booklet L2.

Figure 12:
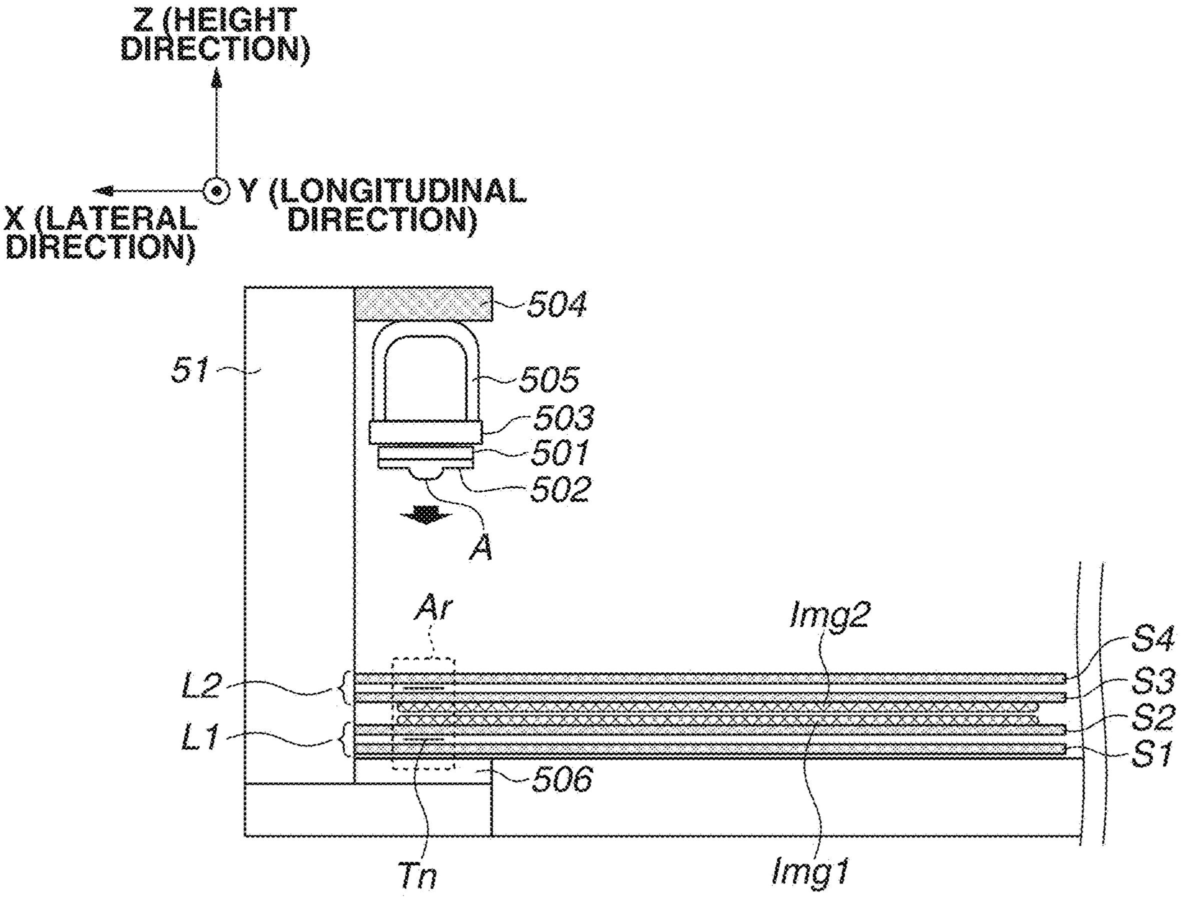
FIG. 12 is a diagram illustrating a case of bonding a booklet with an image on its front or rear cover.

In a case where such two booklets are bonded with heat and pressure by the heat and pressure bonding unit 51 as illustrated in FIG. 12, a portion of the user image Img1 in a heat and pressure bonding region Ar may transfer onto an image of the user image Img2, or the user image Img2 may transfer onto an image of the user image Img1. Further, even in a case where only one of the user image Img1 and the user image Img2 is printed, the user image Img1 may transfer onto the sheet S3, or the user image Img2 may transfer onto the sheet S2. An occurrence of any of the foregoing phenomena can decrease the quality of the final printed material.

Thus, the embodiment determines whether there is a user image within the heat and pressure bonding region Ar of the front or rear cover sheet. Based on this determination result, it is selected whether to convey a sheet S of a preceding booklet and a sheet S of a subsequent booklet in the same sheet bundle W. In one embodiment, the sheet S of the preceding booklet and the sheet S of the subsequent booklet are conveyed together only in a case where there is no risk of user image transfer onto an adjacent sheet S, thereby maintaining the quality of the printed material while improving productivity.

Figure 13:
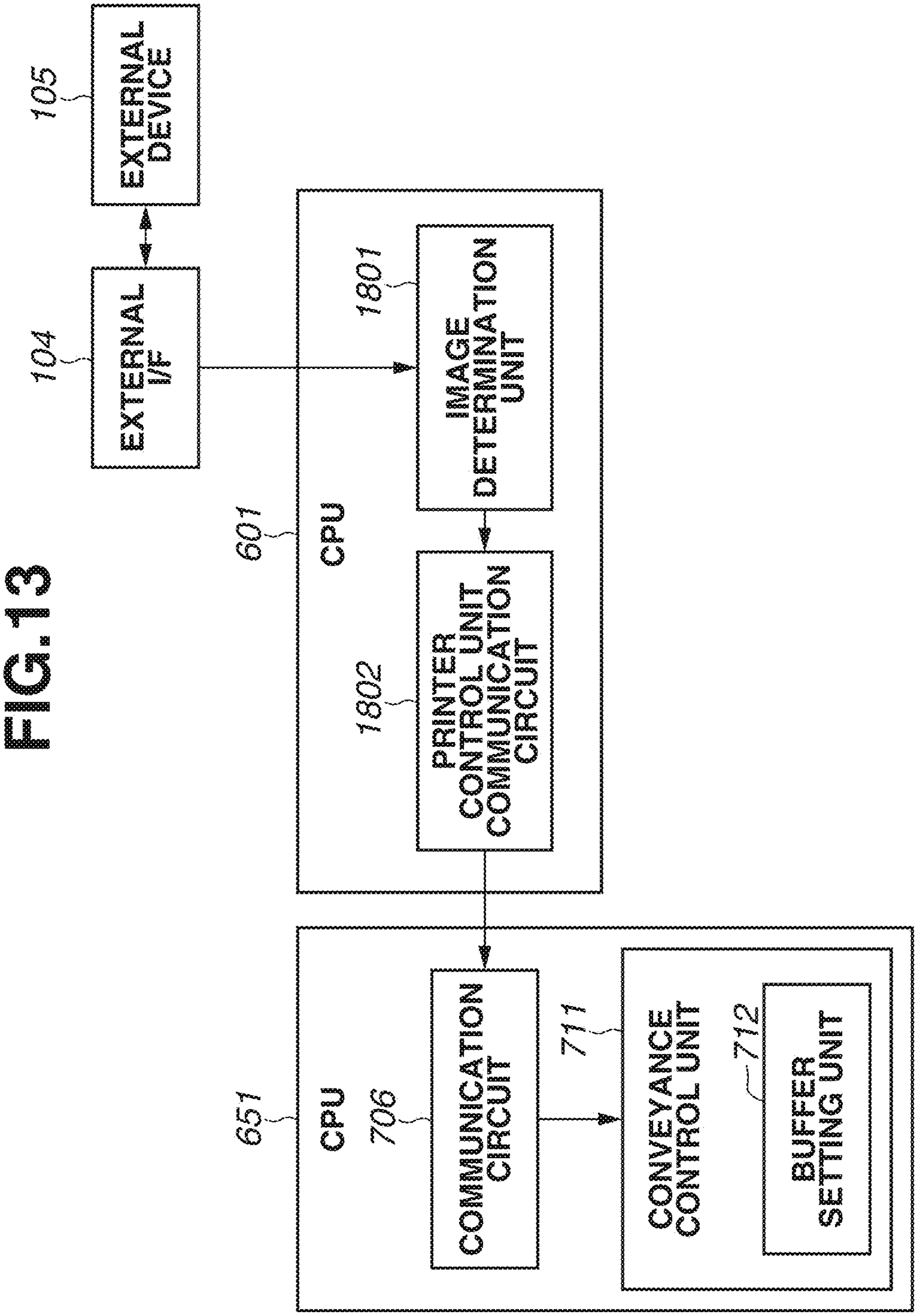
FIG. 13 is a diagram illustrating functions of a CPU of an image determination unit according to the first embodiment.

FIG. 13 illustrates some of the functions realized by the CPU 601 of the printer control unit 600 and the CPU 651 of the finisher control unit 650 according to the embodiment. The functions that are not illustrated in FIG. 13 are similar to those in FIG. 7, so that descriptions thereof will be omitted.

Image information (user image) about an image forming job issued to the image forming system 1 and input from the external device 105 is input to an image determination unit 1801 via the external interface (I/F) 104.

The image determination unit 1801 determines whether the user image Img1 or the user image Img2 is in the heat and pressure bonding region Ar of the rear cover of the booklet L1 or the front cover of the booklet L2. Then, this user image determination result is notified to the conveyance control unit 711 via a printer control unit communication circuit 1802 and the communication circuit 706. For example, in a case where neither the user image Img1 nor the user image Img2 is in the heat and pressure bonding region Ar, the conveyance control unit 711 is notified that "there is no user image", whereas in a case where at least one of the user image Img1 and the user image Img2 is present, the conveyance control unit 711 is notified that "there is a user image". Then, the user image determination result received by the conveyance control unit 711 is also notified to the buffer setting unit 712 and used during a process of the buffer setting unit 712.

Figure 14A:
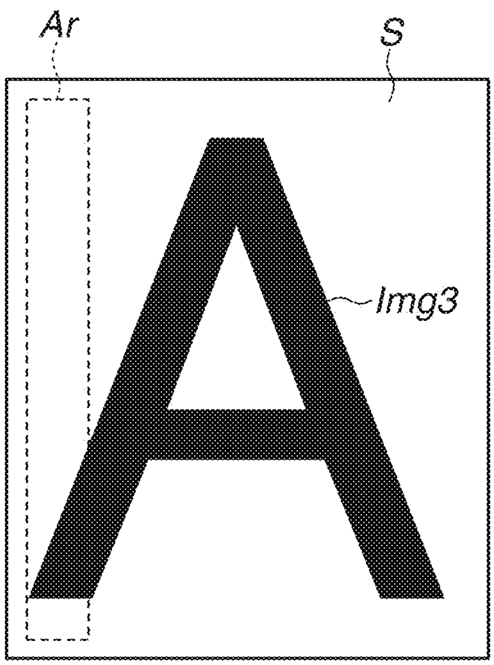
FIGS. 14A and 14B are diagrams for determining a function of the image determination unit according to the first embodiment.
Figure 14B:
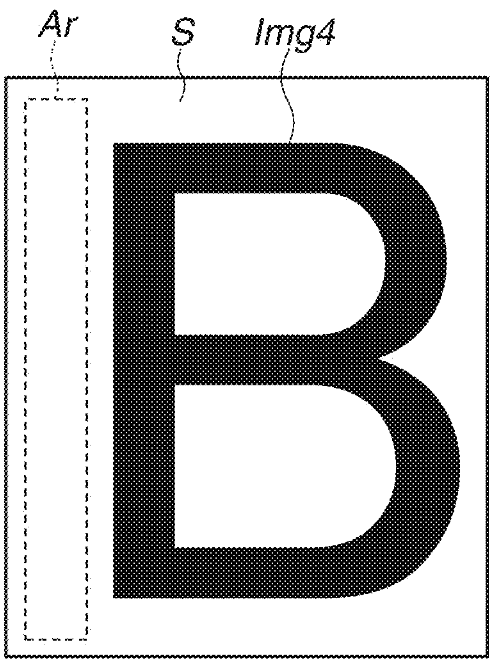

FIGS. 14A and 14B illustrate a method for determining the presence or absence of a user image by the image determination unit 1801. In FIG. 14A, a user image Img3 is included within the heat and pressure bonding region Ar, so that it is determined that "there is a user image". In FIG. 14B, on the other hand, a user image Img4 is not included within the heat and pressure bonding region Ar, so that it is determined that "there is no user image". The heat and pressure bonding region Ar is preset based on the size of the heating plate 502, the target temperature, and the like. Further, although the embodiment determines that "there is a user image" in a case where even a small portion of a user image is included within the heat and pressure bonding region Ar, a different determination condition may be employed. For example, the determination may be performed based on whether the proportion of the area of a user image included within the heat and pressure bonding region Ar is greater than or equal to a predetermined proportion.

Figure 15:
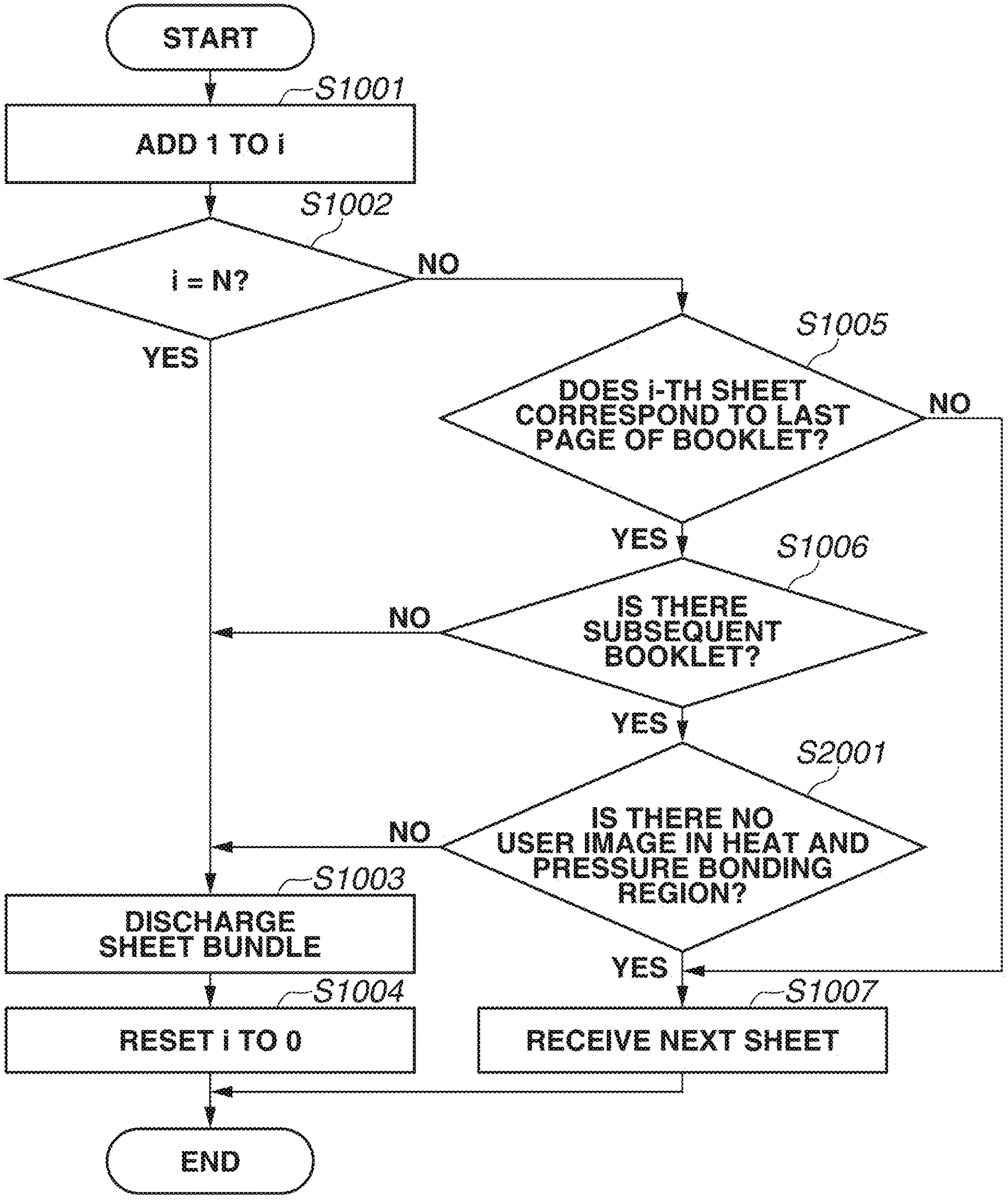
FIG. 15 is a flowchart illustrating image determination according to the first embodiment.

FIG. 15 illustrates a process performed by the buffer setting unit 712 according to the embodiment. In a case where the trailing edge of a sheet S is detected by the sheet sensor 27, the following process is performed.

Step S1001 to step S1007 in FIG. 15 correspond to those in FIG. 10A, so that descriptions thereof will be omitted, and only different portions will be described.

In step S1006, in a case where there is a subsequent booklet (YES in step S1006), the processing proceeds from step S1006 to step S2001. In step S2001, the CPU 651 determines whether there is a user image, based on a received user image determination result. It should be noted that the user image determination result is notified in advance to the conveyance control unit 711.

In a case where there is a user image in the heat and pressure bonding region (NO in step S2001), in order to prevent mixing of sheet bundles, the processing proceeds from step S2001 to step S1003. In other words, the sheet bundle W is discharged from the buffer unit 80 and conveyed to the intermediate stacking portion 42.

On the other hand, in a case where there is no user image (YES in step S2001), the processing proceeds from step S2001 to step S1007. In step S1007, the CPU 651 continues receiving a subsequent sheet into the buffer unit 80. In other words, the buffer operation continues.

This makes it possible to convey a sheet S of a preceding booklet and a sheet S of a subsequent booklet int the same sheet bundle W in a case where there is a user image on a rear cover of the preceding booklet or a front cover of the subsequent booklet only in a case where it is determined that there is no risk of image transfer. This makes it possible to continuously generate a plurality of booklets while maintaining the quality of the printed material without decreasing the productivity of the image forming system 1.

Further, even in a case where the number M of sheets S included in a single booklet is an integer multiple of the maximum number N of sheets S included in a sheet bundle W, sheet generation may be performed as described in the embodiment. Specifically, in a case where there is a user image on a rear cover of a preceding booklet or a front cover of a subsequent booklet, even if the number of sheets at the intermediate stacking portion 42 has not reached the maximum number, a subsequent bundle sheet may be received into the intermediate stacking portion 42 after a previously generated booklet is discharged.

Second Embodiment

The first embodiment assumes that the total number U (e.g., 24) of sheets S included in a plurality of booklets stacked on the intermediate stacking portion 42 does not exceed the maximum number Q (e.g., 100) of sheets S that can be stacked on the intermediate stacking portion 42. Thus, a second embodiment will describe how to handle a case where the total number U (e.g., 104) exceeds the maximum number Q (e.g., 100). In particular, a method for continuously generating booklets while adhering to the constraint relating to the maximum number Q in a case where the conveyance control unit 711 cannot obtain information about the total number U of sheets S of a job will be described below.

Figure 16:
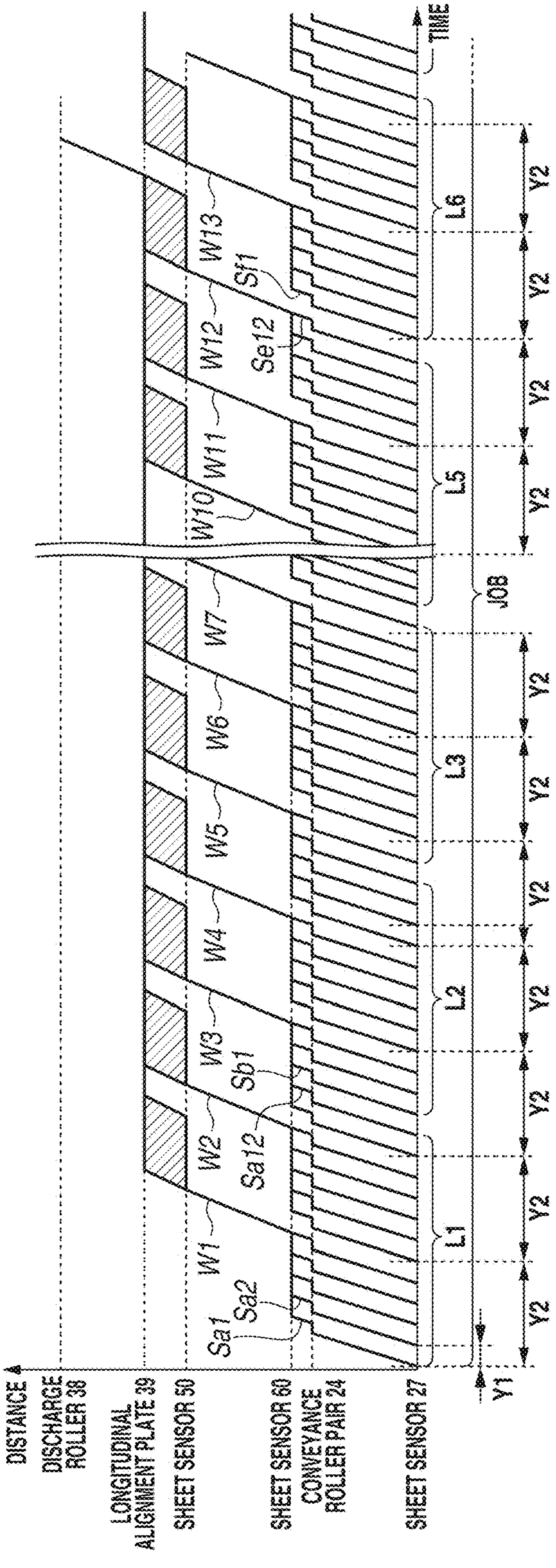
FIG. 16 is a diagram illustrating a timing chart according to a second embodiment.

FIG. 16 is a conveyance diagram illustrating a case where six or more booklets each consisting of twelve sheets S are generated. The description of FIG. 16 is basically similar to that of FIG. 8A. However, for clarity of FIG. 16, the reference numerals assigned to the sheets S and the notation for the conveyance intervals Y1 are omitted. In FIG. 16, although the booklets L1 to L6 are illustrated, no information about the total number U of the job is obtained by the conveyance control unit 711.

Even in this case, the conveyance control unit 711 repeats a process in which the buffer unit 80 forms a sheet bundle W consisting of five sheets S and conveys the sheet bundle W into the intermediate stacking portion 42 and the heat and pressure bonding operation is performed on the sheet bundle W. A sheet Se12 corresponding to the last page of the twelfth sheet bundle W12 corresponds to the last page of the fifth booklet L5. The sheet Se12 satisfies the condition in step S1011 in the flowchart illustrated in FIG. 10B. Upon completion of the booklet L5 at the intermediate stacking portion 42, the five booklets L1 to L5 are discharged together to the lower tray 37.

In FIG. 16, generation of the booklet L6 is ongoing, and a sheet bundle W13 is conveyed to the intermediate stacking portion 42, which has become empty. The same operation applied to the sheet bundles W1 to W12 is also applied to the sheet bundle W13. In a case where the last sheet S of the sheet bundle W and the last sheet S of the booklet L correspond before the maximum number Q of sheets S that can be stacked on the intermediate stacking portion 42 is reached, as described above, all booklets stacked on the intermediate stacking portion 42 are discharged to the lower tray 37. In a case where the number R (e.g., 60) of sheets S stacked on the intermediate stacking portion 42 becomes an integer multiple of the total number M (e.g., 12) and also an integer multiple of the maximum number N (e.g., 5) of the buffer unit 80 before exceeding the maximum number Q of the intermediate stacking portion 42 as described above, no issues arise.

Figure 17:
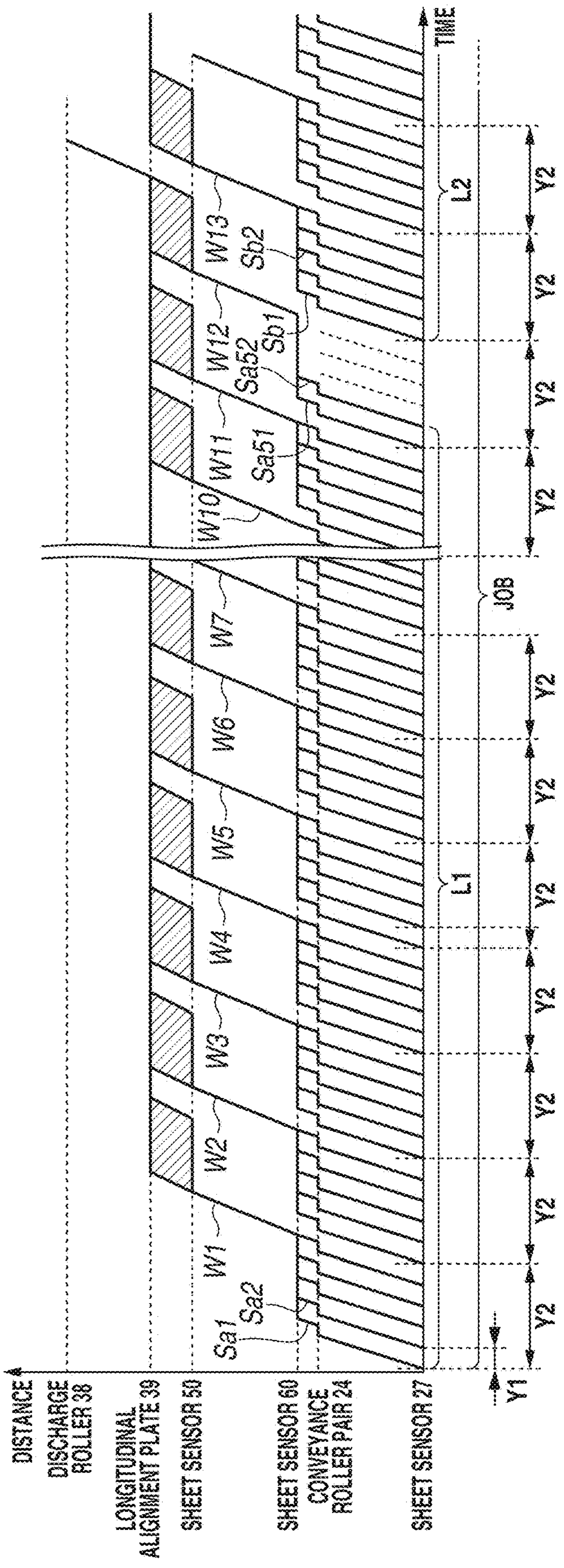
FIG. 17 is a diagram illustrating a timing chart according to a second embodiment.

FIG. 17 illustrates a case where the booklets L1 and L2 for which M=52 are continuously generated. In this case, a sheet Sa52 corresponding to the last page of the eleventh sheet bundle W11 becomes the last page of the booklet L1. Suppose that the sheet bundle W11 including the sheet Sb1 of the subsequent booklet L2 and the sheet Sa52 is formed and conveyed into the intermediate stacking portion 42. In this case, the booklet L1 cannot be discharged from the intermediate stacking portion 42 until the booklet L2 is completed. In a case where the booklet L2 is a booklet consisting of 52 sheets S, the number R of sheets S stacked on the intermediate stacking portion 42 is 104, which exceeds the maximum number Q.

Thus, the sheet Sb1 and the sheet Sa52 are not to be included in the same sheet bundle W11. In other words, the sheet bundle W11 consisting of a sheet Sa51 and the sheet Sa52 is conveyed to the intermediate stacking portion 42. Upon completion of the booklet L1, the booklet L1 is discharged to the lower tray 37. It should be noted that the interval between the last sheet bundle W11 of the booklet L1 and the first sheet bundle W12 including the first page of the booklet L2 is to be Y2. Thus, the conveyance control unit 711 notifies the image forming apparatus 100, via the communication circuit 706, that the sheet interval between the sheet Sa52 and the sheet Sb1 is to be 4×Y1.

Figure 18:
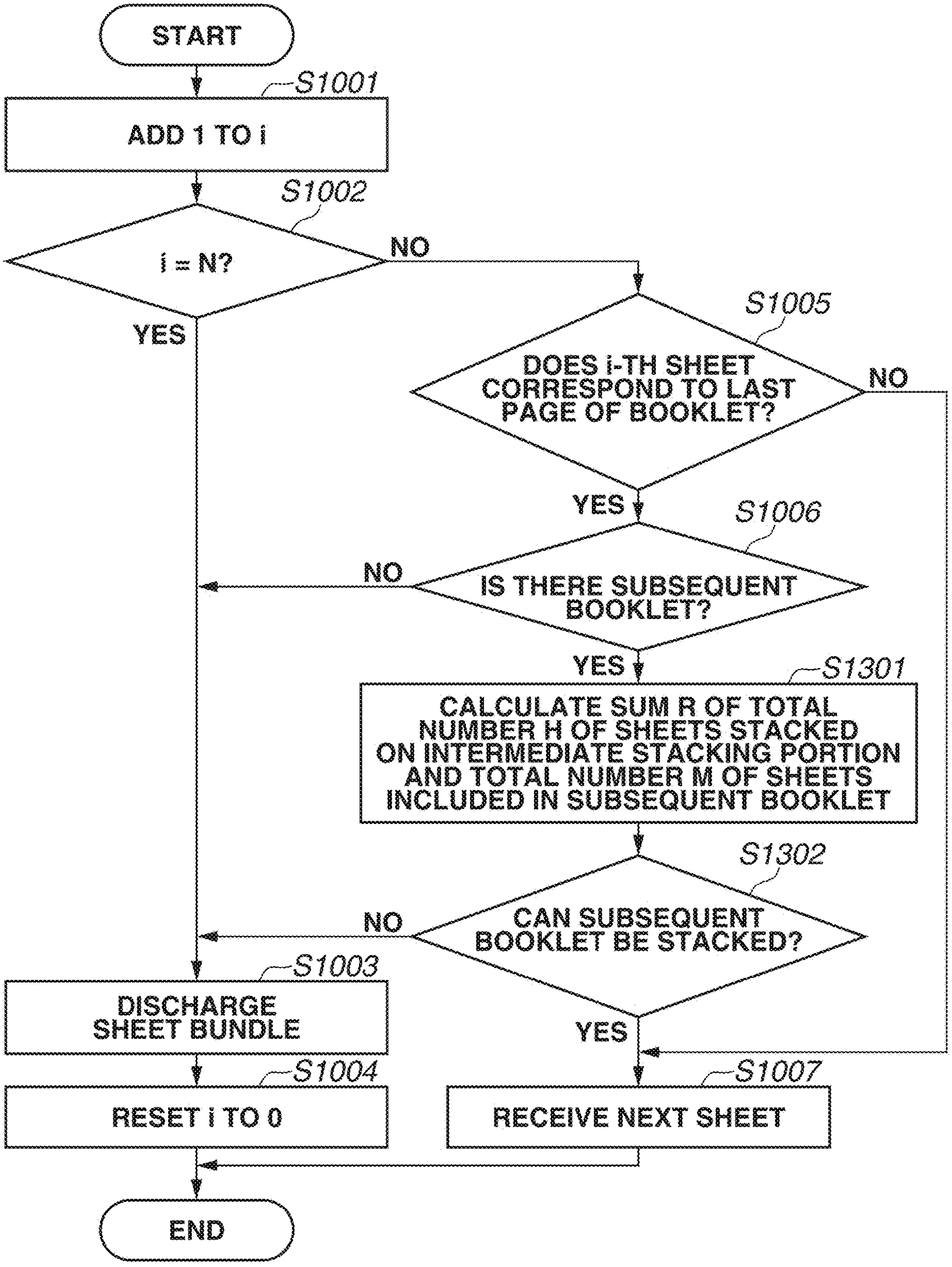
FIG. 18 is a flowchart illustrating a determination method regarding a discharge from a buffer unit according to the second embodiment.

FIG. 18 illustrates a method for setting a boundary of a sheet bundle W that is performed by the CPU 651 according to a program. In FIG. 18, steps S1301 and S1302 are inserted between steps S1006 and S1007, compared to FIG. 10A. Thus, mainly steps S1301 and S1302 will be described. The counter 716 counts the total number H of sheets S stacked on the intermediate stacking portion 42.

Step S1301 is performed in a case where the determination result is YES in step S1006. In step S1301, the CPU 651 calculates the sum R of the total number H of sheets S stacked on the intermediate stacking portion 42 and the total number M of sheets S included in the subsequent booklet.

$$R=H+M. \tag{1}$$

In step S1302, the CPU 651 determines whether the subsequent booklet can be stacked on the intermediate stacking portion 42, based on the sum R and the maximum number Q. In a case where the sum R is less than or equal to the maximum number Q, the CPU 651 determines that the subsequent booklet can be stacked (YES in step S1302), and the processing proceeds from step S1302 to step S1007. On the other hand, in a case where the sum R is greater than the maximum number Q, the CPU 651 determines that the subsequent booklet cannot be stacked (NO in step S1302), and the processing proceeds from step S1302 to step S1003.

Figure 19:
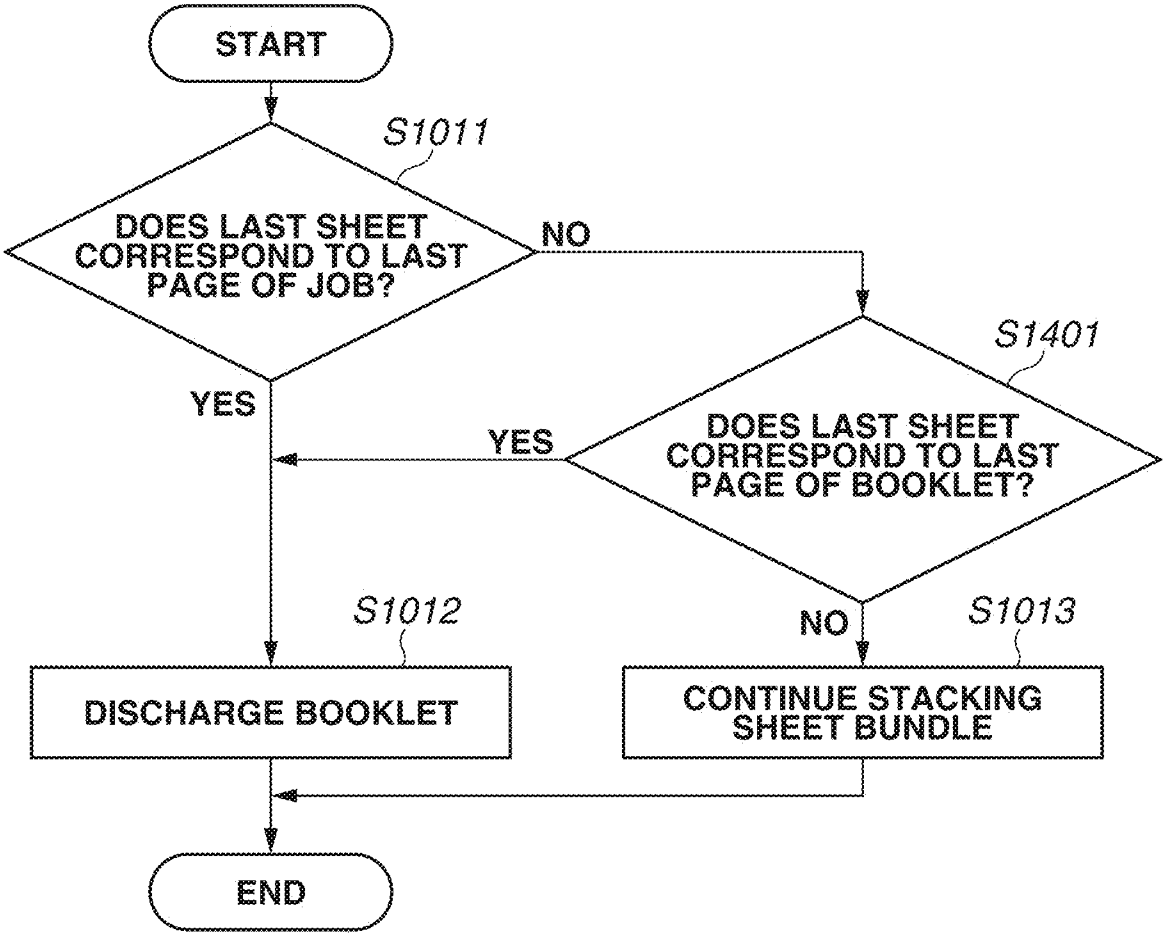
FIG. 19 is a flowchart illustrating a determination method regarding a discharge from an intermediate stacking portion according to the second embodiment.

FIG. 19 illustrates a process of determining whether to discharge a booklet from the intermediate stacking portion 42. In FIG. 19, step S1401 is added, compared to FIG. 10B. Since step S1011 to step S1013 are described above, redundant descriptions thereof will be omitted.

In step S1011, in a case where the last sheet of the sheet bundle W conveyed to the intermediate stacking portion 42 does not correspond to the last page of the job (NO in step S1011), the processing proceeds from step S1011 to step S1401.

In step S1401, the CPU 651 determines whether the last sheet of the sheet bundle W conveyed to the intermediate stacking portion 42 corresponds to the last page of the booklet. In a case where the last sheet of the sheet bundle W corresponds to the last page of the booklet (YES in step S1401), the processing proceeds from step S1401 to step S1012. In other words, all booklets stacked on the intermediate stacking portion 42 are discharged. This case includes both the case illustrated as an example in FIG. 16 (the case where H is an integer multiple of N) and the case illustrated as an example in FIG. 17 (the case where H is not an integer multiple of N). On the other hand, in a case where the last sheet of the sheet bundle does not correspond to the last page of the booklet (NO in step S1401), the booklet is still incomplete. Thus, the processing proceeds from step S1401 to step S1013. Consequently, stacking of a subsequent sheet bundle on the intermediate stacking portion 42 continues.

The second embodiment makes it possible to continuously form booklets even in a case where the total number of sheets S of the job is unknown. In other words, sheets S are stacked on the intermediate stacking portion 42 within the allowable stacking range.

It becomes possible to include and convey a sheet S of a preceding booklet and a sheet S of a subsequent booklet in the same sheet bundle W. As a result, it becomes possible to continuously generate a plurality of booklets without decreasing the productivity of the image forming system 1.

It should be noted that while the embodiment describes a method in which the user image determination process is added to the process of the buffer setting unit 712 according to the first embodiment, the user image determination process may be added to the buffer setting unit 712 according to the embodiment. In this case, an effect similar to that of the first embodiment is produced by adding step S2001 immediately after the determination is YES in step S1006 in FIG. 18.

Additional Note

Further, the disclosure of the embodiment includes the following configuration examples and method examples.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2024-185911, filed Oct. 22, 2024, which is hereby incorporated by reference herein in its entirety.

What is claimed is:

1. An apparatus comprising:

a forming unit configured to receive a sheet one by one and form a sheet bundle consisting of a maximum of N sheets;

a conveyance unit configured to convey the sheet bundle upon completion of sheet bundle formation;

a stacking unit configured to stack the conveyed sheet bundle;

a bonding unit configured to generate a booklet consisting of M sheets by heating and pressurizing an adhesion portion each time the sheet bundle is stacked on the stacking unit;

a discharge unit configured to discharge, upon completion of generation of L booklets at the stacking unit, the L booklets from the stacking unit;

a control unit configured to control the forming unit, the conveyance unit, the stacking unit, the bonding unit, and the discharge unit; and a determination unit configured to determine whether there is an image in a region of a front cover of a booklet or a rear cover of a booklet that is to be heated and pressurized by the bonding unit, wherein the forming unit generates a sheet bundle consisting of N sheets including an M-th sheet to be included in a k-th booklet and a first sheet to be included in a (k+1)th booklet, wherein the bonding unit bonds a preceding sheet and a subsequent sheet stacked on the stacking unit, excluding the M-th sheet to be included in the k-th booklet and the first sheet to be included in the (k+1)th booklet, and wherein the control unit counts a number i of sheets layered at the forming unit, wherein in a case where the determination unit determines that there is no image in a region of a front cover of the (k+1)th booklet or a rear cover of the k-th booklet that is to be heated and pressurized by the bonding unit, if i reaches N, the control unit causes the conveyance unit to convey the sheet bundle from the forming unit to the stacking unit, and wherein in a case where the determination unit determines that there is an image in the region of the front cover of the (k+1)th booklet or the rear cover of the k-th booklet that is to be heated and pressurized by the bonding unit, even if i is less than N, the control unit causes the conveyance unit to convey the sheet bundle without including a sheet to be included in the (k+1)th booklet from the forming unit to the stacking unit.

2. The apparatus according to claim 1, wherein in a case where an i-th sheet received by the forming unit corresponds to the M-th sheet of an L-th booklet, even if i is less than N, the conveyance unit is controlled to convey the sheet bundle from the forming unit to the stacking unit.

3. The apparatus according to claim 1, wherein an L-th booklet corresponds to a last booklet of a single job, and the M-th sheet of the L-th booklet is a sheet that corresponds to a last page of the single job.

4. The apparatus according to claim 1, wherein an L-th booklet is generated during a single job that generates Y booklets, where Y is an integer greater than L.

5. The apparatus according to claim 4, wherein the control unit causes the forming unit to suspend receiving a first sheet of an (L+1)th booklet until the forming unit finishes discharging a sheet bundle including the M-th sheet of the L-th booklet.

6. The apparatus according to claim 5, wherein the control unit suspends conveyance of a sheet bundle that is to form the (L+1)th booklet from the forming unit to the stacking unit until the discharge unit finishes discharging the first to L-th booklets.

7. The apparatus according to claim 1, wherein in a case where the number i reaches the number N, the control unit causes the conveyance unit to convey the sheet bundle from the forming unit to the stacking unit, (1) wherein in a case where the number i is less than the number N, an i-th sheet conveyed to the forming unit corresponds to the M-th sheet of the booklet, and the booklet generated at the stacking unit corresponds to an L-th booklet, the control unit causes the conveyance unit to convey the sheet bundle from the forming unit to the stacking unit, (2) wherein in a case where the number i is less than the number N, the i-th sheet conveyed to the forming unit corresponds to the M-th sheet of the booklet, and the booklet generated at the stacking unit does not correspond to the L-th booklet, the control unit causes the forming unit to receive an (i+1)th sheet, and (3) wherein in a case where the number i is less than the number N, the i-th sheet conveyed to the forming unit does not correspond to the M-th sheet, the control unit causes the forming unit to receive the (i+1)th sheet.

8. The apparatus according to claim 1, further comprising a forming unit configured to form an image on the sheet and form a bonding pattern using a thermoplastic adhesive on a remaining sheet that is not intended to serve as the front cover of the booklet, wherein the bonding unit bonds a preceding sheet to a subsequent sheet by applying heat to the sheet bundle stacked on the stacking unit and melting the bonding pattern formed on the subsequent sheet.

9. The apparatus according to claim 8, wherein the bonding pattern is formed using toner.

10. The apparatus according to claim 1, wherein the determination unit determines whether there is an image based on a proportion of an area of an image in the region of the front cover of the booklet or the rear cover of the booklet that is to be heated and pressurized by the bonding unit.

11. An apparatus comprising:

a layering unit configured to form a sheet bundle by layering a plurality of sheets and temporarily hold the sheet bundle;

a conveyance unit configured to convey the sheet bundle held by the layering unit;

a stacking unit configured to stack one or more sheet bundles conveyed by the conveyance unit;

a bonding unit configured to generate a booklet by bonding one or more sheet bundles stacked on the stacking unit;

a discharge unit configured to discharge the booklet from the stacking unit;

a control unit configured to control the number of sheets included in each sheet bundle formed by the layering unit and the discharge of the booklet from the discharge unit; and a determination unit configured to determine whether there is an image in a region of a front cover of a booklet or a rear cover of a booklet that is to be heated and pressurized by the bonding unit, wherein in a case where the number of sheets layered by the layering unit is less than a predetermined number, the control unit causes the layering unit to continue the sheet layering process, and wherein in a case where the determination unit determines that there is an image in the region of the front cover of the booklet or the rear cover of the booklet that is to be heated and pressurized by the bonding unit, even if the number of layered sheets is less than the predetermined number, the control unit causes the conveyance unit to convey the sheet bundle from the layering unit to the stacking unit to prevent the sheet with the image from being layered on a sheet of another booklet.

12. The apparatus according to claim 11, wherein in a case where the number of sheets layered by the layering unit reaches the predetermined number or the number of sheets layered by the layering unit is less than the predetermined number but an uppermost sheet on the layering unit corresponds to a last page of a job, the conveyance unit is caused to convey the sheet bundle from the layering unit to the stacking unit, and wherein in a case where an uppermost sheet of the sheet bundle conveyed from the layering unit to the stacking unit by the conveyance unit is a sheet that corresponds to the last page of the job, the discharge unit is caused to discharge all booklets stacked on the stacking unit.

13. The apparatus according to claim 11, wherein in a case where an uppermost sheet of the sheet bundle conveyed from the layering unit to the stacking unit by the conveyance unit is a sheet that corresponds to a last page of a booklet, the control unit causes the discharge unit to discharge all booklets stacked on the stacking unit.

14. The apparatus according to claim 11, wherein the control unit causes the bonding unit to perform the bonding process each time a sheet bundle is stacked on the stacking unit.

15. The apparatus according to claim 11, further comprising a forming unit configured to form an image on the sheet and form a bonding pattern using a thermoplastic adhesive on a remaining sheet that is not intended to serve as the front cover of the booklet, wherein the bonding unit bonds a preceding sheet to a subsequent sheet by applying heat to the sheet bundle stacked on the stacking unit and melting the bonding pattern formed on the subsequent sheet.

16. The apparatus according to claim 11, wherein the layering unit includes one or more sheets to be included in a preceding booklet and one or more sheets to be included in a subsequent booklet in the sheet bundle by layering a sheet corresponding to a first page of the subsequent booklet on a sheet corresponding to a last page of the preceding booklet.

17. The apparatus according to claim 11, wherein the determination unit determines whether there is an image based on a proportion of an area of an image in the region of the front cover of the booklet or the rear cover of the booklet that is to be heated and pressurized by the bonding unit.

18. A system comprising:

a forming apparatus configured to form an image on a sheet; and a processing apparatus connected to the forming apparatus, the processing apparatus comprising:

a forming unit configured to receive a sheet one by one and form a sheet bundle consisting of a maximum of N sheets;

a conveyance unit configured to convey the sheet bundle upon completion of sheet bundle formation;

a stacking unit configured to stack the sheet bundle conveyed by the conveyance unit;

a bonding unit configured to generate a booklet consisting of M sheets by heating and pressurizing an adhesion portion each time the sheet bundle is stacked on the stacking unit;

a discharge unit configured to discharge, upon completion of generation of L booklets at the stacking unit, the L booklets from the stacking unit;

a control unit configured to control the forming unit, the conveyance unit, the stacking unit, the bonding unit, and the discharge unit; and a determination unit configured to determine whether there is an image in a region of a front cover of a booklet or a rear cover of a booklet that is to be heated and pressurized by the bonding unit, wherein the forming unit generates a sheet bundle consisting of N sheets including an M-th sheet to be included in a k-th booklet and a first sheet to be included in a (k+1)th booklet, wherein the bonding unit bonds a preceding sheet and a subsequent sheet stacked on the stacking unit, excluding the M-th sheet to be included in the k-th booklet and the first sheet to be included in the (k+1)th booklet, and wherein the control unit counts a number i of sheets layered at the forming unit, wherein in a case where the determination unit determines that there is no image in a region of a front cover of the (k+1)th booklet or a rear cover of the k-th booklet that is to be heated and pressurized by the bonding unit, if i reaches N, the control unit causes the conveyance unit to convey the sheet bundle from the forming unit to the stacking unit, and wherein in a case where the determination unit determines that there is an image in the region of the front cover of the (k+1)th booklet or the rear cover of the k-th booklet that is to be heated and pressurized by the bonding unit, even if i is less than N, the control unit causes the conveyance unit to convey the sheet bundle without including a sheet to be included in the (k+1)th booklet from the forming unit to the stacking unit.

19. The system according to claim 18, wherein in a case where an i-th sheet received by the forming unit corresponds to the M-th sheet of an L-th booklet, even if i is less than N, the conveyance unit is controlled to convey the sheet bundle from the forming unit to the stacking unit.

20. The system according to claim 18, wherein the determination unit determines whether there is an image based on a proportion of an area of an image in the region of the front cover of the booklet or the rear cover of the booklet that is to be heated and pressurized by the bonding unit.

* * * * *